(12) United States Patent
Hoppe

(10) Patent No.: US 7,904,202 B2
(45) Date of Patent: Mar. 8, 2011

(54) METHOD AND SYSTEM TO PROVIDE IMPROVED ACCURACIES IN MULTI-JOINTED ROBOTS THROUGH KINEMATIC ROBOT MODEL PARAMETERS DETERMINATION

(75) Inventor: Wally C. Hoppe, Dayton, OH (US)

(73) Assignee: University of Dayton, Dayton, OH (US)

( * ) Notice: Subject to any disclaimer, the term of this patent is extended or adjusted under 35 U.S.C. 154(b) by 624 days.

(21) Appl. No.: 11/666,187

(22) PCT Filed: Oct. 25, 2005

(86) PCT No.: PCT/US2005/038359
§ 371 (c)(1),
(2), (4) Date: Apr. 24, 2007

(87) PCT Pub. No.: WO2006/086021
PCT Pub. Date: Aug. 17, 2006

(65) Prior Publication Data
US 2008/0188986 A1    Aug. 7, 2008

(51) Int. Cl.
*G06F 19/00* (2006.01)
(52) U.S. Cl. ......... 700/245; 700/250; 700/251; 700/253; 700/254; 700/252; 700/263
(58) Field of Classification Search ................. 700/245, 700/250, 251, 254, 262, 253, 263, 159, 83, 700/85; 318/568.1, 568.11, 568.17, 568.19, 318/568.21, 568.24, 567, 568.12, 568.2; 382/146, 151, 154, 145, 103, 199, 291, 294, 382/295, 287, 152; 717/104, 109
See application file for complete search history.

(56) References Cited

U.S. PATENT DOCUMENTS 4,763,276 A * 8/1988 Perreirra et al. ............ 700/262
4,836,742 A * 6/1989 Ishiguro et al. ............. 414/742

(Continued)

FOREIGN PATENT DOCUMENTS

FR    2 677 755 A1    12/1992

(Continued)

OTHER PUBLICATIONS

Meggiolaro, Marco A, Manipulator Calibration using a single endpoint contact constraint, pp. 1-9.

(Continued)

*Primary Examiner* — Dalena Tran
*Assistant Examiner* — Jaime Figueroa
(74) *Attorney, Agent, or Firm* — Dinsmore & Shohl LLP

(57) ABSTRACT

A method and system to provide improved accuracies in multi jointed robots through kinematic robot model parameters determination are disclosed. The present invention calibrates multi-jointed robots by using the chain rule for differentiation in the Jacobian derivation for variations in calculated poses of reference points of a reference object as a function of variations in robot model parameters. The present invention also uses two such reference objects and the known distance therebetween to establish a length scale, thus avoiding the need to know one link length of the robot. In addition, the present invention makes use of iterative methods to find the optimum solution for improved accuracy of the resultant model parameters. Furthermore, the present invention provides for determination of the end joint parameters of the robot, including parameters defining the tool attachment mechanism frame, which allows for interchange of tools without subsequent calibration.

24 Claims, 19 Drawing Sheets

U.S. PATENT DOCUMENTS

| | | | |
|---|---|---|---|
| 4,893,254 A | | 1/1990 | Chan et al. |
| 5,056,031 A * | | 10/1991 | Nakano et al. ............... 701/301 |
| 5,177,563 A | | 1/1993 | Everett et al. |
| 5,293,461 A | | 3/1994 | Grudic et al. |
| 5,297,238 A * | | 3/1994 | Wang et al. .................. 700/259 |
| 5,347,459 A * | | 9/1994 | Greenspan et al. ........... 700/255 |
| 5,392,384 A * | | 2/1995 | Tounai et al. ................. 700/254 |
| 5,430,643 A | | 7/1995 | Seraji |
| 5,570,609 A * | | 11/1996 | Nihei et al. ................ 74/490.05 |
| 5,659,969 A | | 8/1997 | Butler et al. |
| 5,668,453 A | | 9/1997 | Muto et al. |
| 5,687,293 A * | | 11/1997 | Snell ............................ 700/254 |
| 5,737,500 A * | | 4/1998 | Seraji et al. .................. 700/251 |
| 5,740,328 A * | | 4/1998 | Ravani et al. ................ 700/258 |
| 5,887,121 A | | 3/1999 | Funda et al. |
| 5,907,229 A * | | 5/1999 | Snell ............................ 318/569 |
| 6,070,109 A * | | 5/2000 | McGee et al. ................ 700/259 |
| 6,086,283 A * | | 7/2000 | Ziegert ............................ 403/57 |
| 6,408,252 B1 * | | 6/2002 | De Smet ........................ 702/94 |
| 6,456,901 B1 * | | 9/2002 | Xi et al. ........................ 700/245 |
| 6,519,860 B1 | | 2/2003 | Bieg et al. |
| 6,529,852 B2 | | 3/2003 | Knoll et al. |
| 6,681,145 B1 | | 1/2004 | Greenwood et al. |
| 6,812,665 B2 * | | 11/2004 | Gan et al. ................. 318/568.11 |
| 6,980,881 B2 * | | 12/2005 | Greenwood et al. .......... 700/193 |
| 7,571,025 B2 * | | 8/2009 | Bischoff ....................... 700/248 |
| 2002/0013675 A1 * | | 1/2002 | Knoll et al. ................... 702/150 |
| 2002/0189319 A1 * | | 12/2002 | Abbe ............................ 73/1.01 |
| 2003/0200042 A1 * | | 10/2003 | Gan et al. ..................... 702/105 |
| 2004/0162552 A1 * | | 8/2004 | McClurken ..................... 606/41 |
| 2004/0251866 A1 * | | 12/2004 | Gan et al. ................. 318/568.11 |
| 2004/0254677 A1 * | | 12/2004 | Brogardh et al. ............. 700/245 |
| 2005/0038563 A1 * | | 2/2005 | Rauf et al. .................... 700/245 |
| 2005/0125100 A1 * | | 6/2005 | Stoddard et al. .............. 700/245 |
| 2005/0166413 A1 * | | 8/2005 | Crampton ....................... 33/503 |

FOREIGN PATENT DOCUMENTS

| | | |
|---|---|---|
| WO | WO 9311915 A1 * | 6/1993 |
| WO | WO 9630171 A1 * | 10/1996 |

OTHER PUBLICATIONS

Fassi, Irene et al., "Automatic Identification of a Minimum, Complete and Parametrically Continuos Model for the Geometrical Calibration of Parallel Robots", Proceedings of the Workshop on Fundamental Issues and Future Research Directions for Parallel Mechanisms and Manipulators, Oct. 3-4, 2002, pp. 1-11.

Zhong, Xiao-Lin et al, "Autonomous robot calibration using a trigger probe," Robotics and Autonomous Systems, 18 (1996), pp. 395-410.

Newman, Wyatt S. et al., "A New Method for Kinematic Parameter Calibration via Laser Line Tracking," 1993 IEEE, pp. 160-165.

Goswami, Ambarish et al., "Complete Parameter Identification of a Robot From Partial Pose Information," 1992 IEEE International Conference on Systems, Man, and Cybernetics, and the 1993 IEEE International Conference on Robotics and Automation, pp. 26.

Sayeh, Soheil et al., "A New Technique for Solving Robot Calibration Equations with Partially Known Constraints," 1994 IEEE, pp. 387-392.

Zhang, Mike Tao, et al., "Fixture-Based Industrial Robot Calibration for Silicon Wafer Handling," UC Berkeley and Adept Technology, Inc., pp. 1-8.

Conrad, Kevin L., et al., "Robotic Calibration Issues: Accuracy, Repeatability and Calibration," Proceedings of the 8th Mediterranean Conference on Control & Automation (MED 2000), Rio, Patras, Greece, Jul. 17-19, 2000, pp. 1-6.

Shiakolas, P.S., et al., "On the Accuracy, Repeatability, and Degree of Influence of Kinematics Parameters for Industrial Robots," International Journal of Modeling and Simulation, vol. 22, No. 3, 2002, pp. 1-10.

* cited by examiner

METHOD AND SYSTEM TO PROVIDE IMPROVED ACCURACIES IN MULTI-JOINTED ROBOTS THROUGH KINEMATIC ROBOT MODEL PARAMETERS DETERMINATION

The present invention relates generally to robotics, and specifically to a method and system to provide improved accuracies in multi-jointed robots through kinematic robot model parameters determination.

Multi-jointed robots used by industries are not generally considered very accurate. In fact, such industrial multi-jointed robots may not even have a quoted accuracy specification. On the contrary, these robots are purchased because they are repeatable, which can be on the order of ±0.0016 inches. Repeatability is the ability of the robot to return to a given position in space multiple times, and is quantified by the spread or degree of scatter in actual tool tip locations in space about the mean location of the tool tip for a collection of repeat measurements. Accuracy is the ability of the robot to position the tool tip at a commanded location in space, and is quantified by the error in the actual tip location compared to the actual commanded location.

Typically, multi-jointed robots are manually taught what to do by "jogging" the robot through its desired motions while capturing positions along the way. These captured points are used to create motion patterns that can be repeated indefinitely, and the robot will perform that function flawlessly without variation. However, there is a need for accurate robots that can be programmed to perform functions without resort to "teach and learn" robot programming as the industry is moving to programming from blueprints or CAD files. This step is limited by the accuracy of the robot and therefore is currently restricted to very special applications and expensive robots.

In addition, robot calibration requires measuring robot errors in a number of poses, that is the difference between "where it is" and "where it should be," followed by an optimization routine to find the best set of robot model parameters to minimize these measured errors. As used herein, the term "pose" includes position and orientation of the robot tool in space. One prior art method to robot calibration uses an external measuring device to find the actual pose of the robot. Errors are calculated by subtracting the actual pose from the commanded pose of the robot. Unfortunately, such external measuring devices are typically very expensive, and in turn require their own careful calibration. Generally, they also require highly qualified operators in order to produce acceptable results.

It is against the above background that the present invention provides a method and system to provide improved accuracies in multi-jointed robots through kinematic robot model parameters determination. Specifically, model parameters are determined and used in robot controllers to control the motion of a robot end-effector tool to simplify calibration of the robot's accuracy. In this manner, the present invention allows inexpensive multi-jointed robots to achieve accuracies comparable to expensive multi-jointed robots, and allows more opportunities for additional industries to move to this mode of operation. For example, the present invention allows robot motion patterns to be generated from blueprints or CAD files, rather than these patterns being generated through the "teach and learn" method in which the robot is manually "jogged" through its desired motions to determine points for its motion pattern. The present invention also allows tools to be changed without having to recalibrate the robot parameters.

The present invention makes use of geometric constraints to perform parameter identification in order to increase position and orientation accuracy. When the tool or effector object encounters the geometric constraint then the actual robot pose (or partial pose, e.g. position) is defined by the geometry of the calibration object and that of the effector object. At each encounter, the joint values for the robot are stored, defining the joint configuration of the robot for that encounter. Errors are calculated from the difference between: the calculated pose (or partial pose), or other metrics, derived from the measured joint angles and from the current robot model; and the geometry defined by the geometric constraint. Parameter identification is accomplished by an optimization routine designed to find the robot model parameters that minimize these errors.

In one embodiment, the present invention uses an improved robot controller that allows for a mechanical "feedhold" and pose capture on reception of an input signal. This signal is supplied by a touch or trigger probe integrated with the tool. When the tool tip encounters the calibration object, a signal is sent to the controller to read pose (i.e. joint configuration) and to stop robot motion in a controlled fashion. The present invention finds the kinematic model parameters for robots with which to improve pose (position and orientation) accuracy of an end-effector on the robot. Specifically, the present invention finds the robot model parameters by capturing joint values when an "effector" object encounters a reference object. The present invention uses joint values from multiple encounters together with the kinematic model of the robot and the geometry of the reference and effector objects to create mathematical equations that are used in an optimization routine to find the model parameters for the robot. The effector object is an offset touch probe with a spherical tip and the reference object is a sphere. The touch probe provides the trigger when deflection of the tip occurs during an encounter with the sphere. Two spheres are used, with the distance between which is known, to provide a length scale for determining the length model parameters.

In another embodiment, the present invention makes use of external measuring devices to measure the position and orientation of the robot end-effector. It is to be appreciated that both this embodiment and the above-mentioned embodiment make use of differences between the actual pose and the inaccurate pose that the model calculates when using the incorrect model parameters. This approach uses an inexpensive "displacement-measuring device" to interpolate to a geometric constraint with no need for recording joint values. Consequently, it does not require special hardware or software internal to, or interfaced with, the robot controller. However, it does require an external measuring device (the displacement-measuring device), but this device is an inexpensive piece of equipment that is used to interpolate to the geometric constraint.

The following detailed description of the embodiments of the present invention can be best understood when read in conjunction with the following drawings, where like structure is indicated with like reference numerals and in which.

Figures 8A, 8B, 8C:
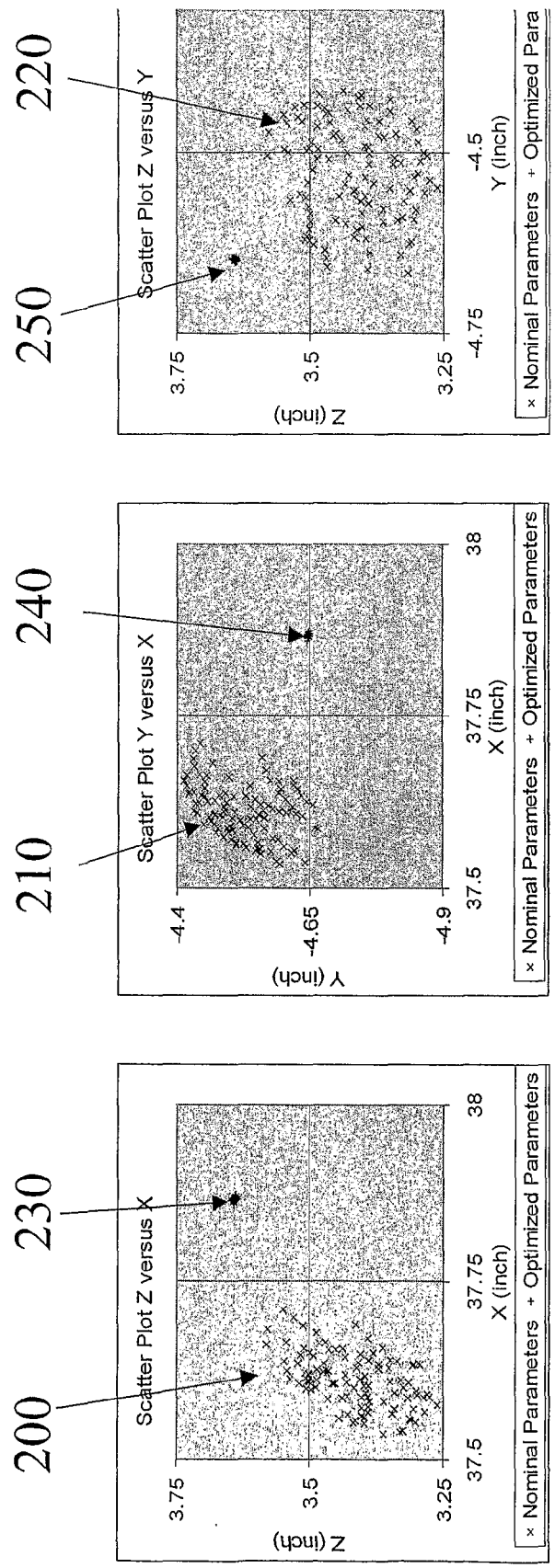

FIGS. 8A, 8B, and 8C are scatter plots showing the calculated sphere center locations in Cartesian coordinates for nominal model parameters and for optimal model parameters determined according to the present invention.

Figure 9:
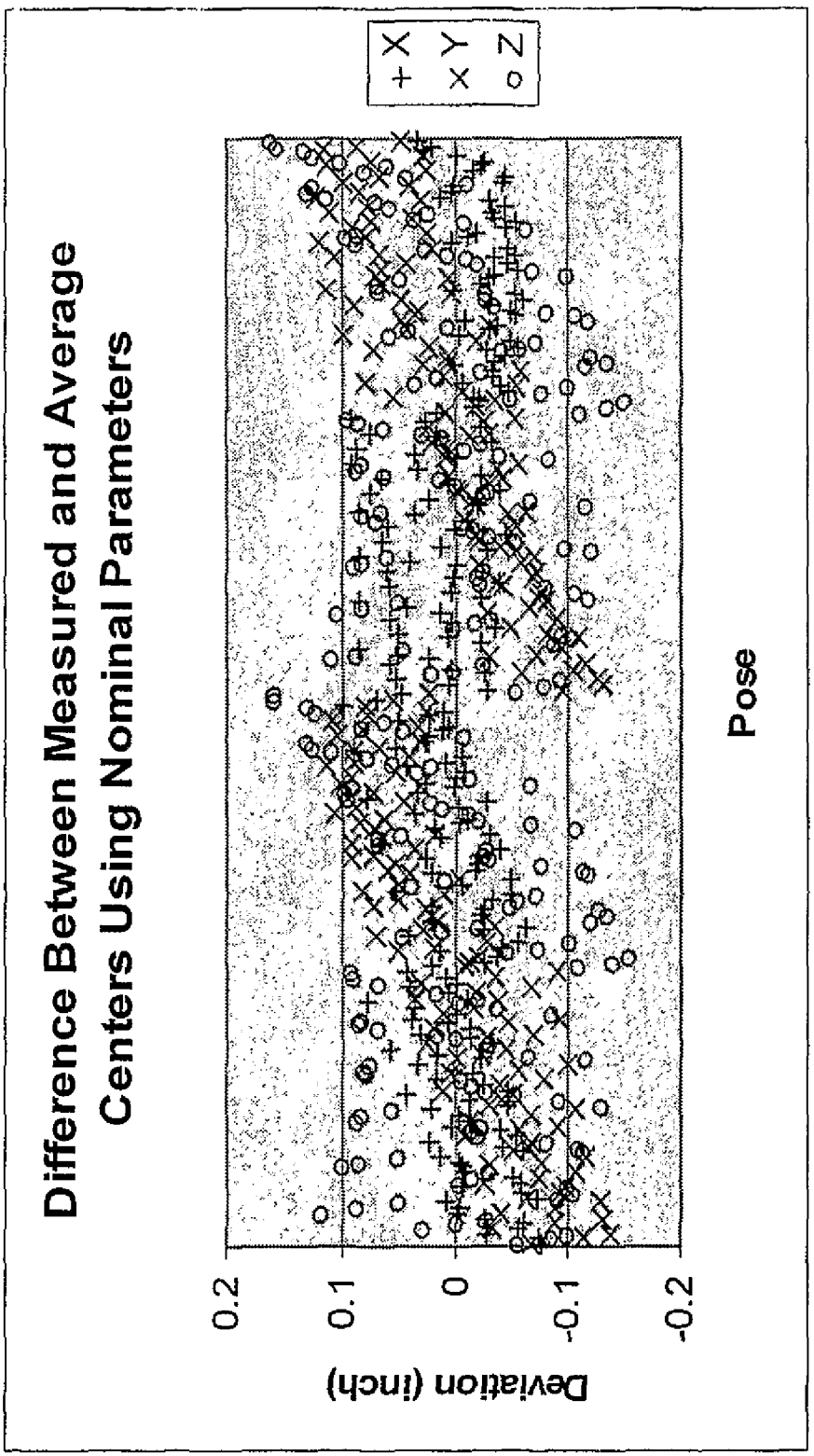

FIG. 9 is a plot of scatter in center positions about the average center position using nominal model parameter values (no optimization).

Figure 10:
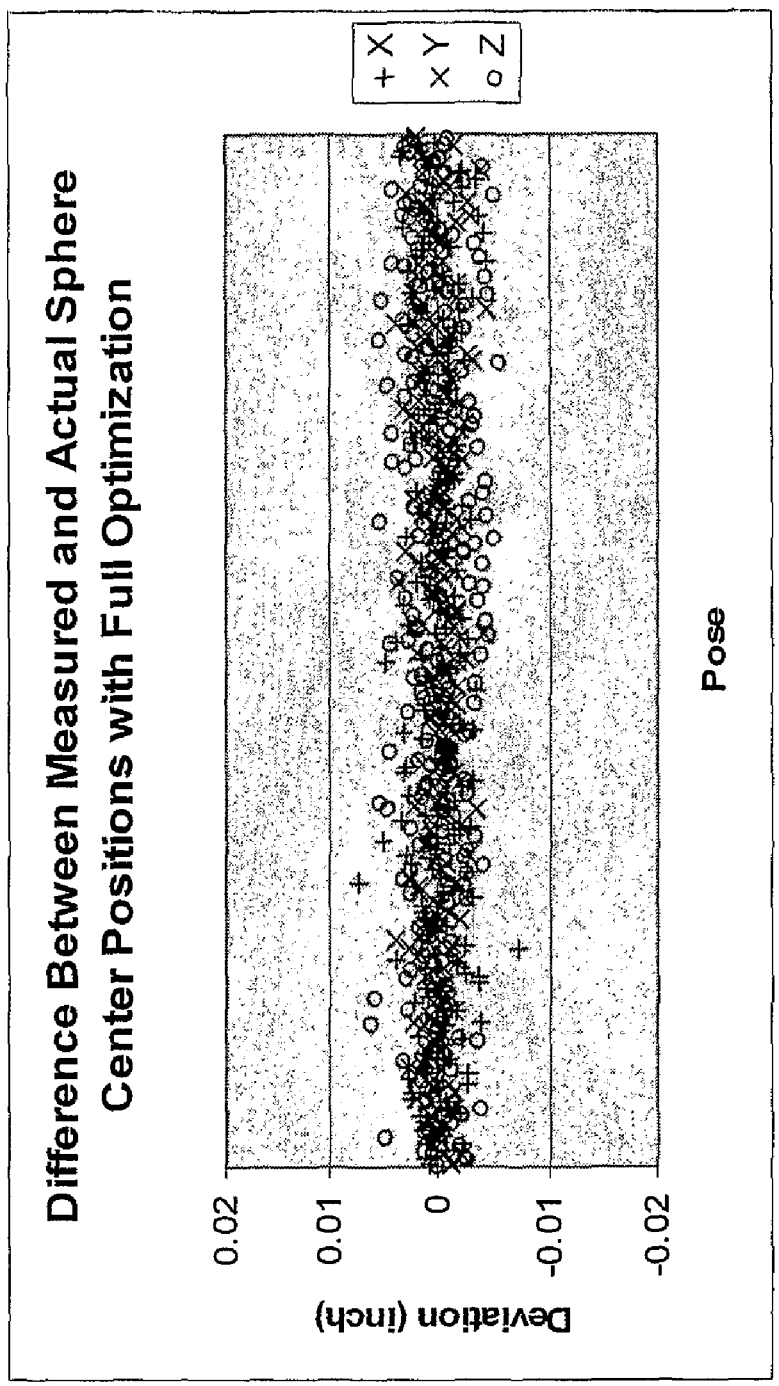

FIG. 10 is a plot of scatter in center positions as a result of optimization on a full set of model parameters according to the present invention.

Figure 11:
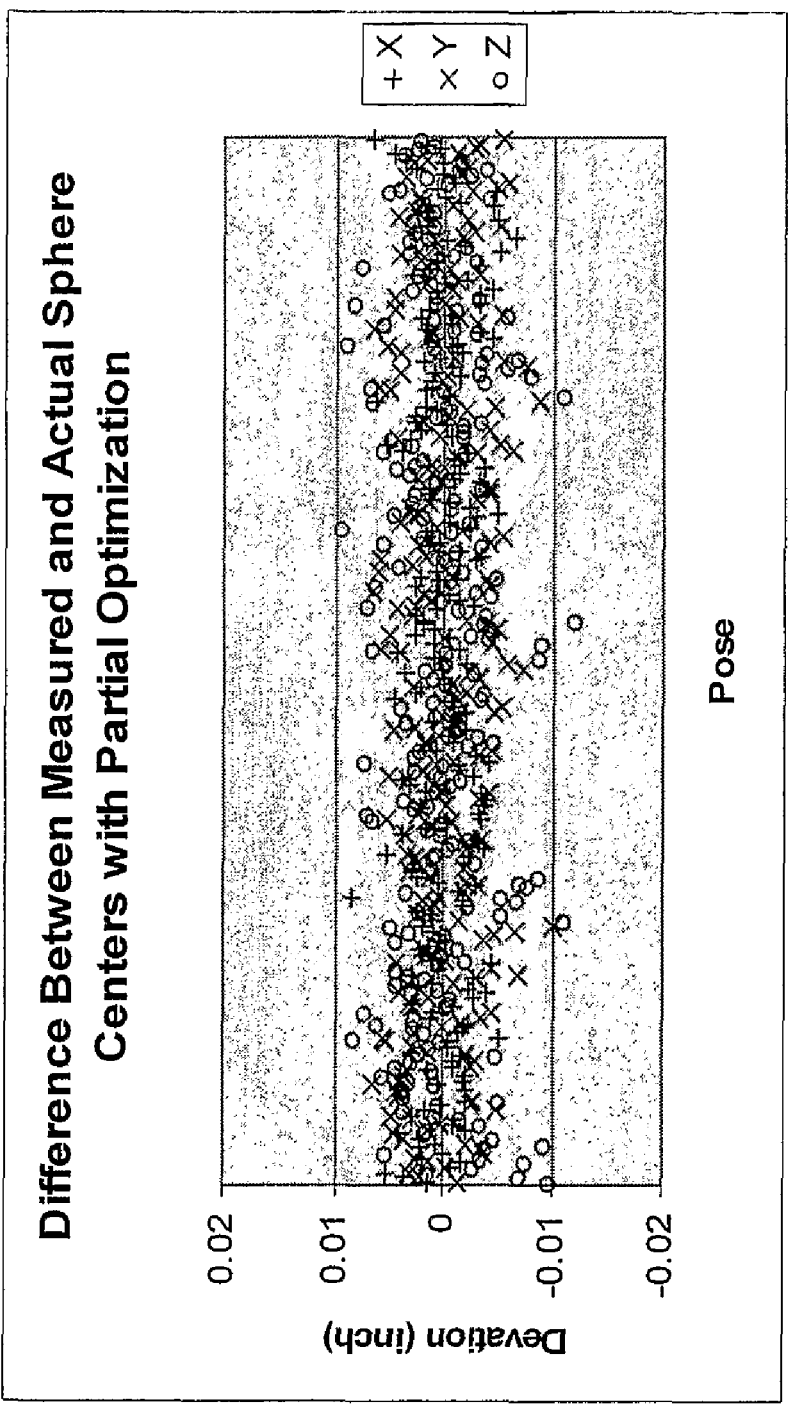

FIG. 11 is a plot of scatter in center positions as a result of optimization on a partial set of model parameters according to the present invention.

Figure 12:
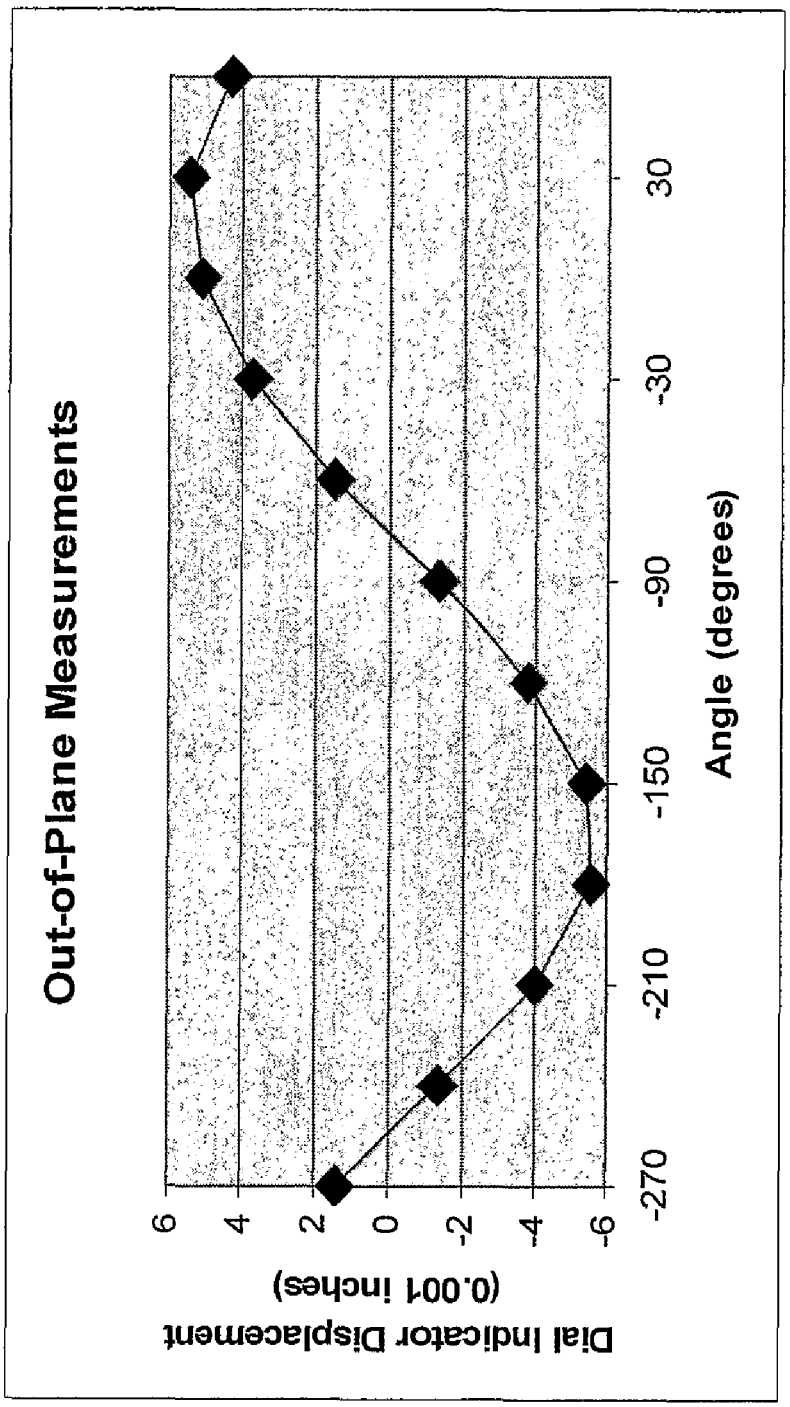

FIG. 12 is a plot of out-of-plane measurements of a face of attachment mechanism reference plate, with displacement of the dial indicator as a function of angle of rotation of the joint.

Figure 13:
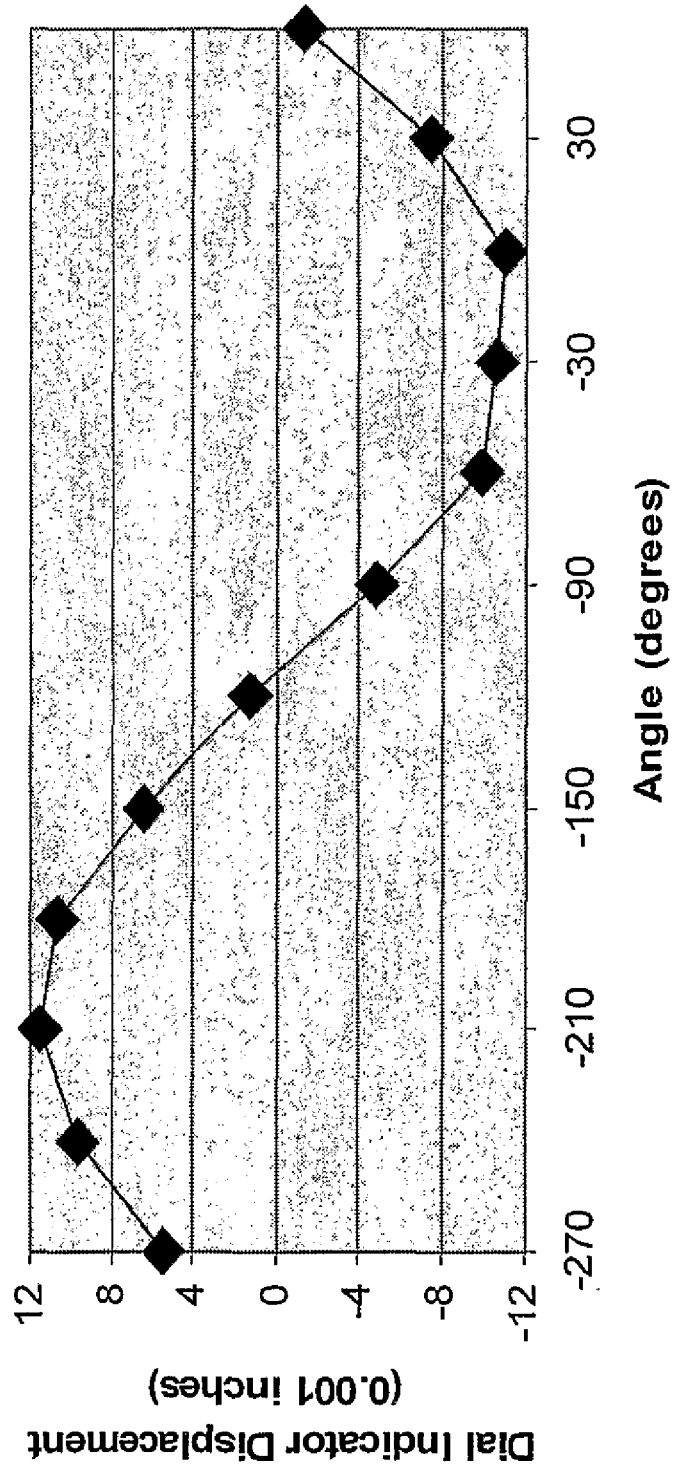

FIG. 13 is a plot of axial displacement of an attachment mechanism cylinder of a robot, with displacement of the dial indicator as a function of angle of rotation of the joint.

Figure 14:
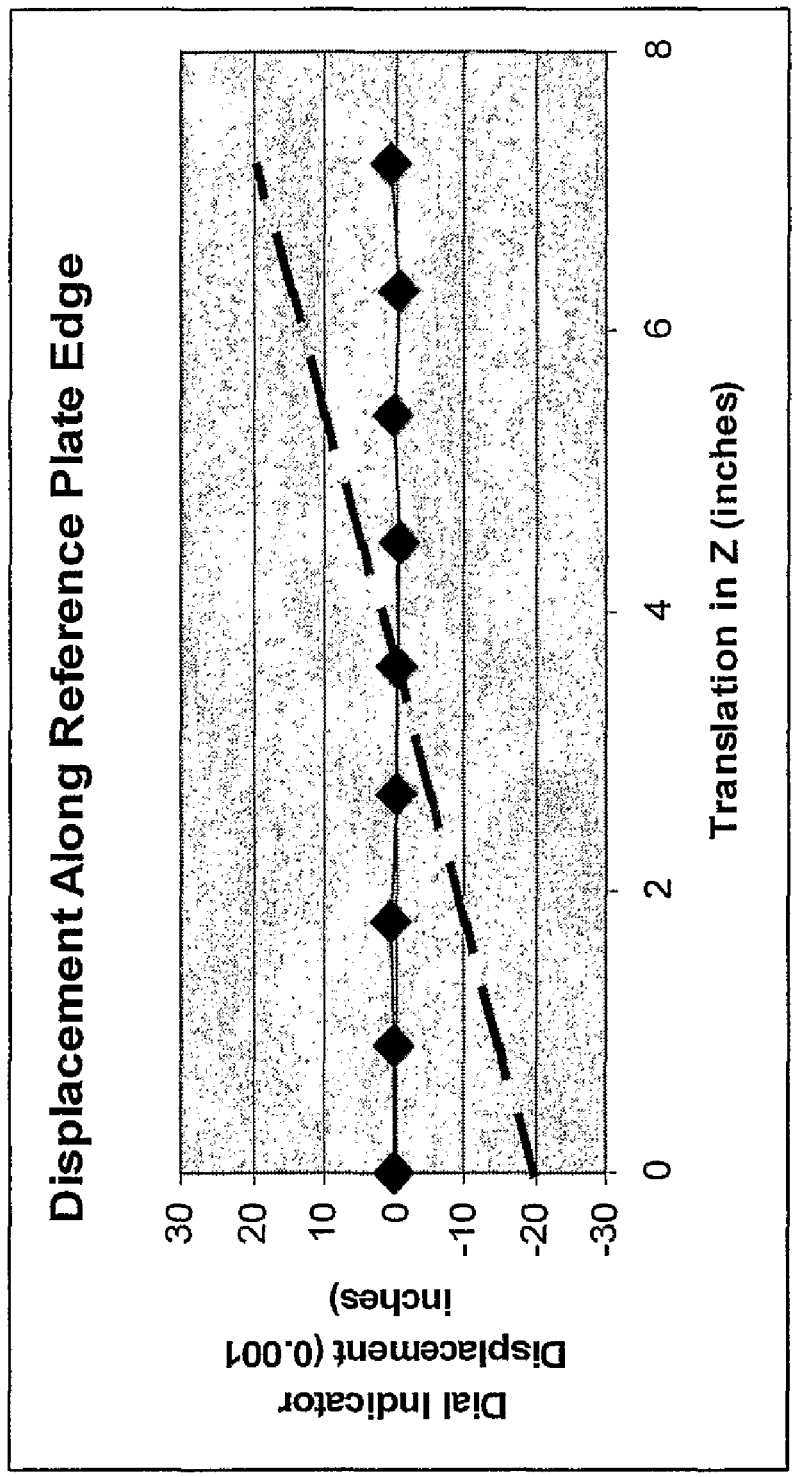

FIG. 14 is a plot of displacement along a reference plate edge to measure twist of the attachment mechanism frame, with displacement of the dial indicator as a function of translation in robot Z.

Figure 15:
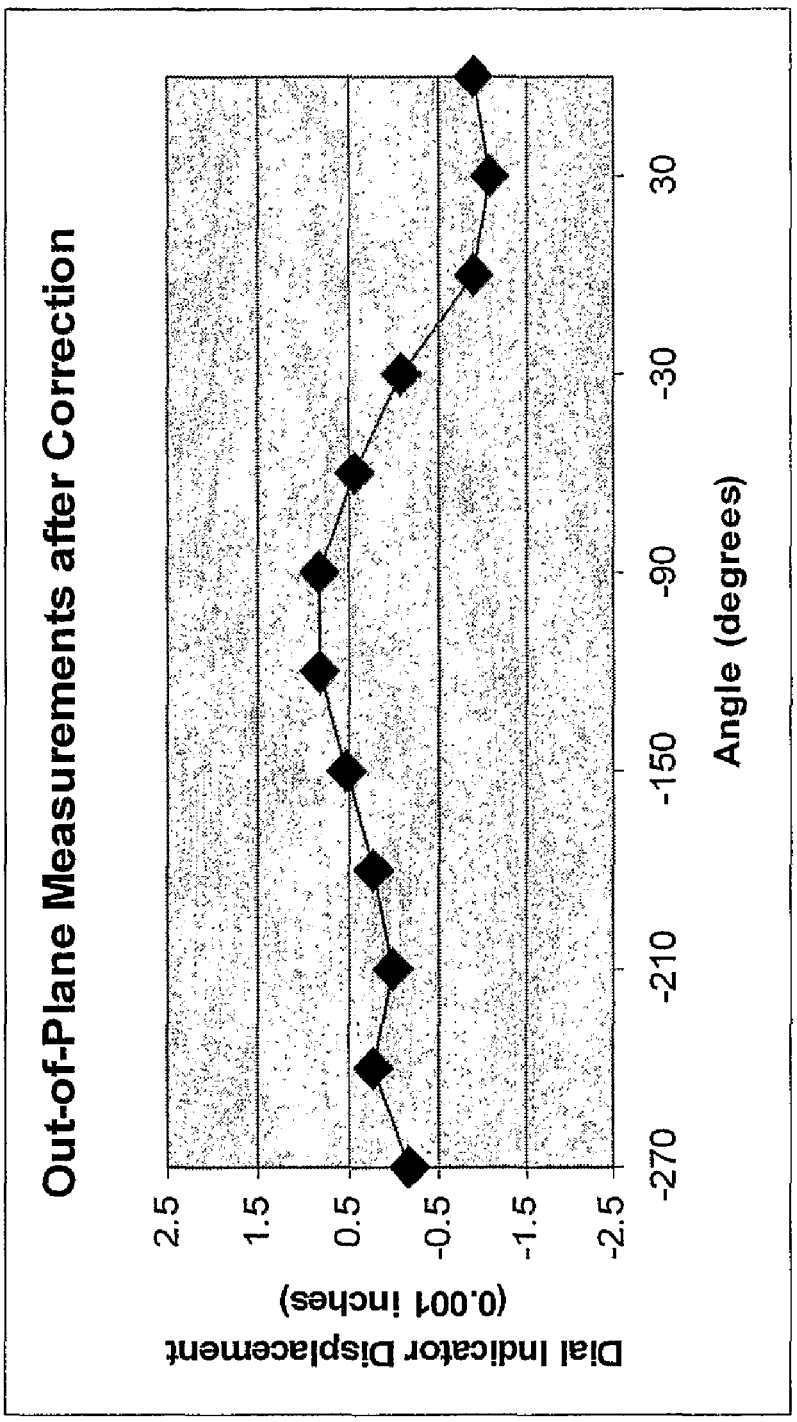

FIG. 15 is a plot of Out-of-Plane Measurements of a face of the attachment mechanism reference plate of FIG. 12 after correction.

Figure 16:
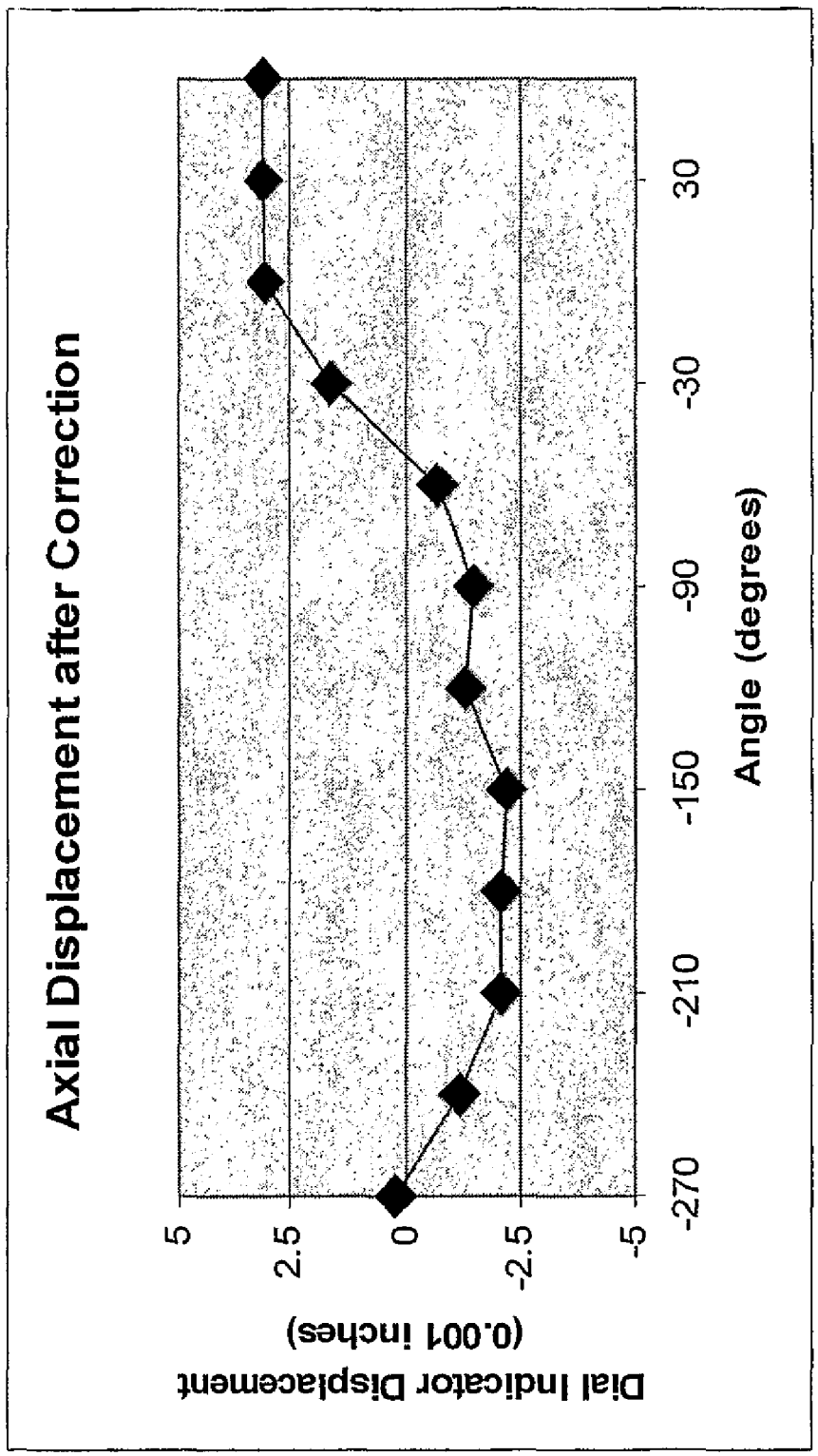

FIG. 16 is a plot of axial displacement of the attachment mechanism cylinder of FIG. 13 after correction.

Figure 17:
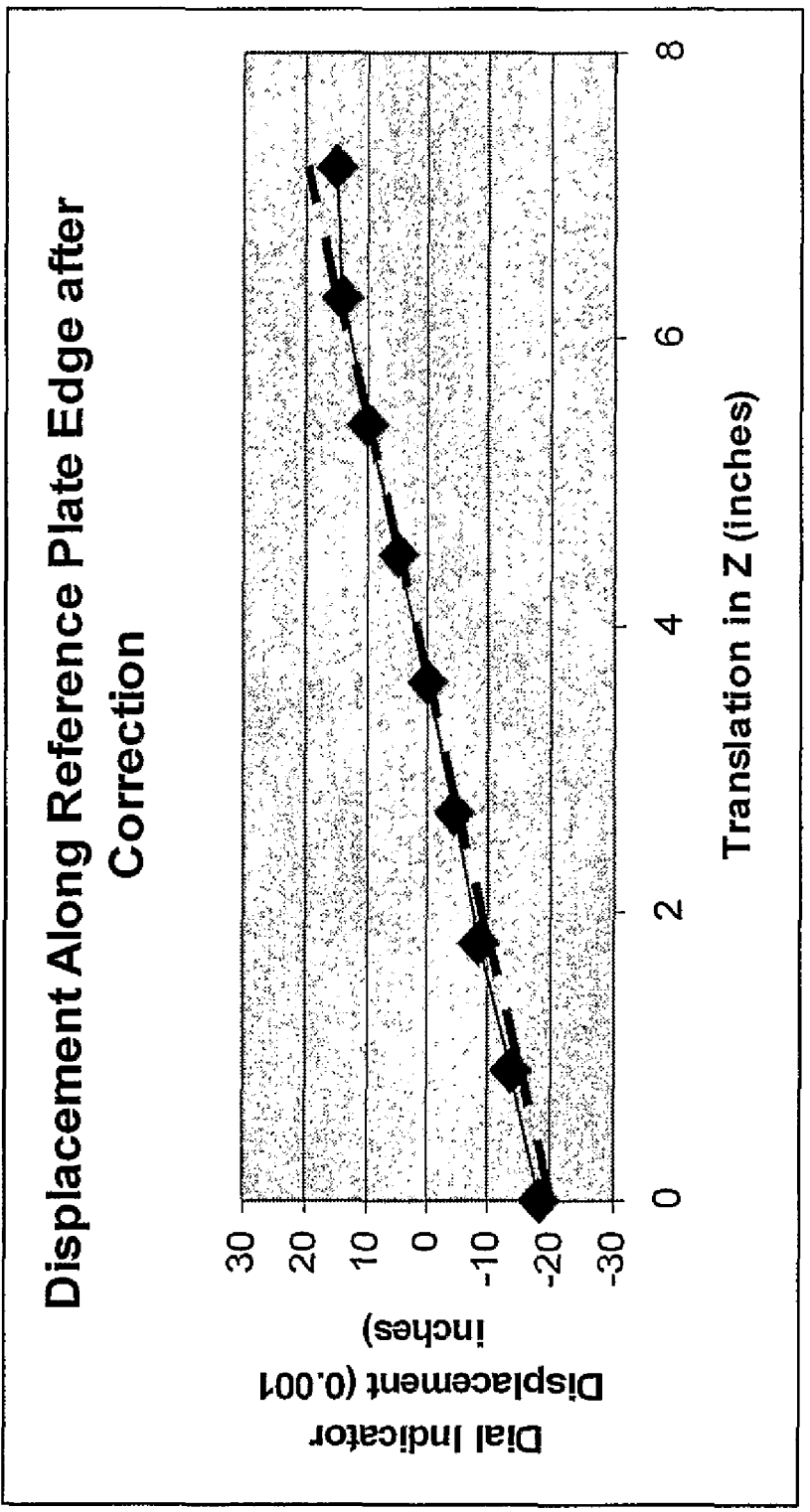

FIG. 17 is a plot of displacement along the reference plate edge to measure twist of the attachment mechanism frame of FIG. 14 after correction.

Figure 18:
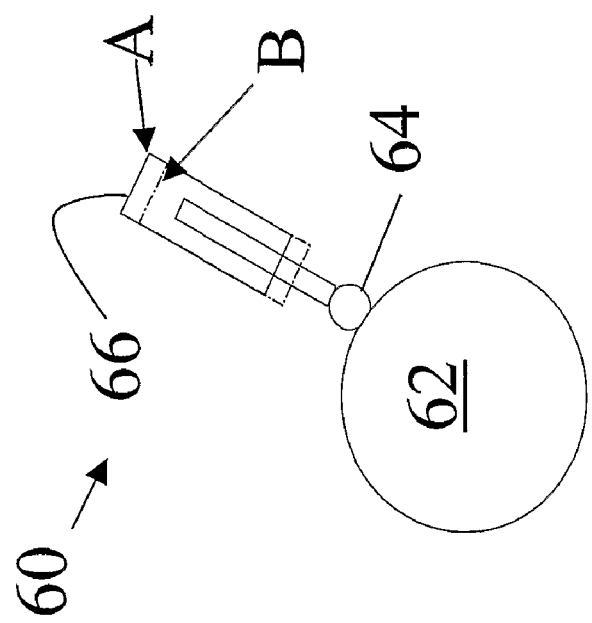

FIG. 18 is a schematic diagram of a displacement measuring device in two different poses.

Figure 19:
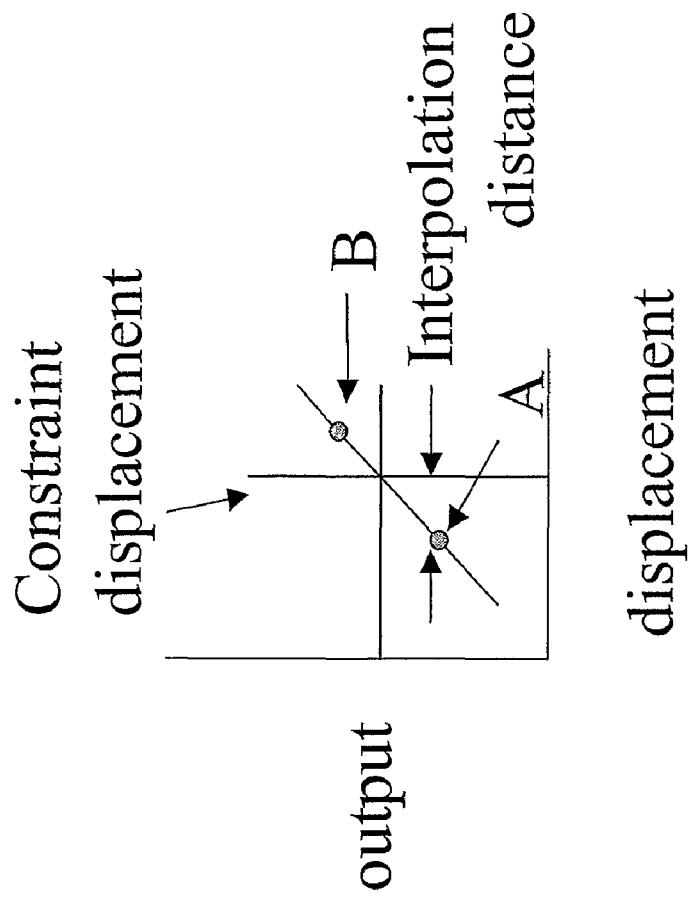

FIG. 19 is an example plot of displacement-measuring device output versus displacement, showing the output of the displacement-measuring device of FIG. 18 at the two poses.

Figure 20:
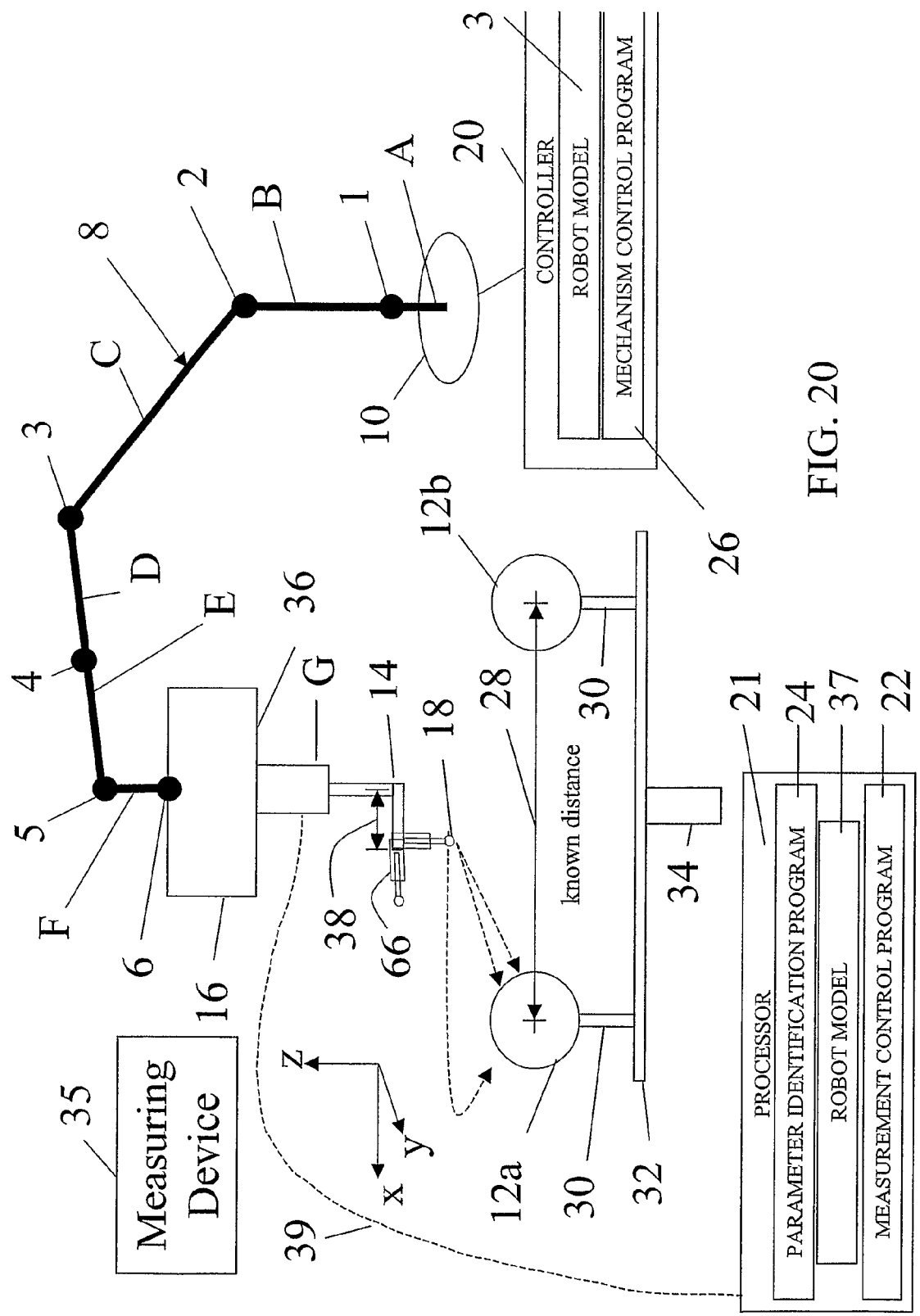

FIG. 20 is a schematic diagram showing a six-axis motorized, automated robot having six rotary joints and a reconfigurable displacement measuring tool connected thereto using two reference objects according to the present invention.

Figure 1:
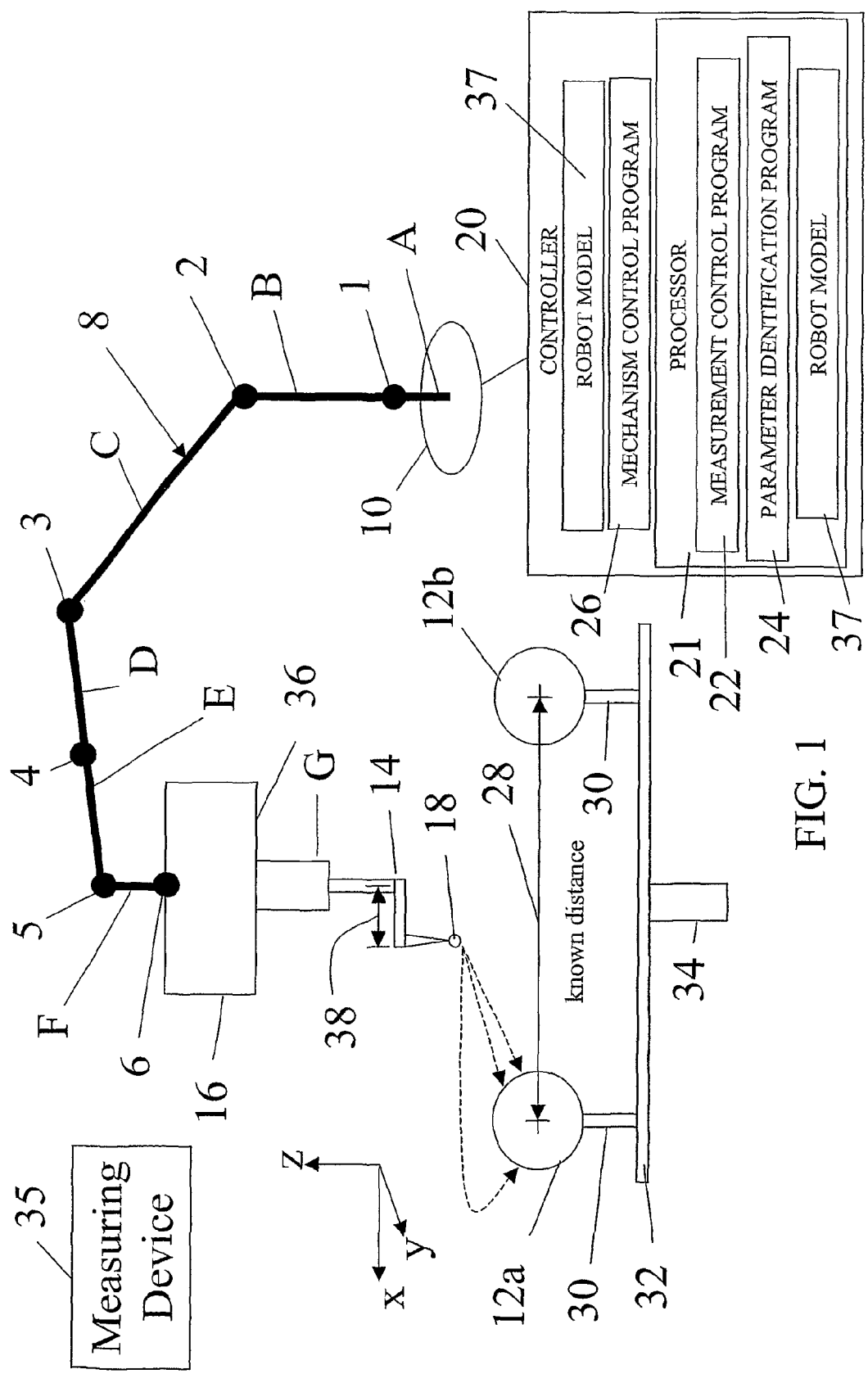
FIG. 1 is a schematic diagram showing a six-axis motorized, automated robot having six rotary joints and a touch probe connected thereto using two reference objects according to the present invention.

Standard automated, motorized, multi-jointed robots make use of computer models of the robot with which to control motion as it moves the end-effecter to desired points within the robot envelope in Cartesian coordinate frames. FIG. 1 illustrates a six-axis motorized robot, indicated by symbol 10, having six rotary joints 1, 2, 3, 4, 5, and 6 connecting links A, B, C, D, E, F, and G (G describes a link between joint 6 and the tool tip). Together, the six rotary joints 1, 2, 3, 4, 5, and 6 and links A, B, C, D, E, F, and G form a multi-jointed robot arm, generally indicated as symbol 8. Robot models require accurate knowledge of the robot dimensions and joint offsets for links A, B, C, D, E, F, and G. Nominal values for these parameters may be adequate for some applications, but advanced and evolving applications require more accurate positioning of the robot end-effecter. In these cases, it is important to know the actual, as-built, robot dimensions and joint offsets for links A, B, C, D, E, F, and G. In one embodiment, these dimensions and joint offsets for links A, B, C, D, E, F, and G are defined in terms of the well-known Denavit-Hartenberg model parameters. See, e.g., Denavit, J. and Hartenburg, R. S., "A Kinematic Notation for Lower-Pair Mechanisms Based on Matrices", ASME, Journal of Applied Mechanics, vol. 22, Transactions ASME, vol. 77, 1955, pp. 215-221, of which material portions are discussed herein and the disclosure of which is herein incorporated by reference. In the illustrated embodiment disclosed herein, each link A, B, C, D, E, F, and G between the robot joints 1, 2, 3, 4, 5, 6, and the tool tip is defined in terms of four parameters, two of which are lengths and two of which are angles. In other embodiments, any other robot models may be used with this invention.

As illustrated, the present invention uses a reference object, such as a sphere 12, and an accurate surface detection device, such as an offset touch probe 14, attached to a robot end-effector or a tool attachment mechanism 16 provided at the end of link F of robot 10. Use of the offset touch probe 14 permits information to be gained on the parameters of the end-joint 6 of the robot arm 8. As will be explained in a later section, additional steps are performed to separate the parameters of the offset touch probe 14 (or the tool attachment mechanism 16) from the parameters of the robot arm 8 to allow interchange of tools.

As shown in FIG. 1, joints 1, 2, 3, 4, 5, and 6 are connected and controlled by a controller 20. In this embodiment, the controller 20 includes a processor 21, a measurement control program 22, a parameter identification program 24, a mechanism control program 26, and a robot model 37. The controller 20 commands the robot 10 to perform its required tasks such as, for example, touching the reference object 12 at various surface points. Specifically, the controller 20 is capable of interpreting coordinates and moving the robot arm 8 to a location within a 3-dimensional space that corresponds to the coordinates. The controller 20 is also capable of reading the axis positions of each joint 1, 2, 3, 4, 5, and 6 in the robot arm 8 using the measurement control program 22. The measurement control program 22 causes the controller 20 to read joint positions of the robot arm 8 when the tool encounters the surface of either sphere. The controller 20 uses the mechanism control program 26 to control movements of the robot arm 8. The processor 21 uses the parameter identification program 24 to identify calibration parameters, using joint offsets found and transmitted by the controller 20 to the processor 21, and using the robot model 37, also stored in the processor, as described herein.

In the explicatory embodiment of FIG. 1, a known length standard 28 is represented by the known distance between the centers of a pair of spheres 12a and 12b. As illustrated, the two spheres 12a and 12b are attached to short posts 30, which in turn are each attached to either end of a bar 32. The bar 32 is attached to a mounting fixture 34 such as a pedestal that can be securely positioned within the robot workspace. The distance between the centers of the spheres 12a and 12b for the length standard 28 is determined independently with any other device (e.g. a coordinate measuring machine) that can accurately measure this distance to within a desired tolerance.

It is to be appreciated that the tolerances for the sphericity of spheres 12a and 12b and the measured distance of length standard 28 must be better than the required degree of accuracy for the calibration, typically by an order of magnitude. For example, the distance between the spheres provides a length scale for the robot model parameters. Percentage errors in this distance will directly result in an equal percentage error in the model lengths, producing a corresponding percentage error in tool tip positioning. Requirements on resultant robot accuracy will therefore drive the required tolerance of the independent measurement of the distance between the spheres and the required sphericity of the spheres. Note that if the robot accuracy requirements are extreme, then the calibration assembly may need to be stable with temperature (length constant over a given temperature range).

It is also to be appreciated that while the geometry of the reference object in the present invention is spherical, finding the center of the sphere (i.e. a point) is a true geometric point constraint and not an extended constraint geometry as is found in some prior art.

As mentioned, the present invention uses the two spheres 12a and 12b to find a length scale that is independent of the robot 10. This is required since the geometric constraint approach does not determine absolute length dimensions, but only ratios of length dimensions. In the illustrated embodiment of FIG. 1, the coordinates of each sphere 12a and 12b are made a part of the vector of unknowns in a Jacobian equation, which is explained in a later section in greater detail. The present invention assumes a length scale (i.e. one of the robot link lengths) and adjusts this scale to make the measured distance between the two sphere centers equal to the known length standard 28.

The touch probe 14, in addition to being mechanically attached to the robot end-effecter 16, is electronically interfaced with the controller 20 to indicate to the controller an encounter. An encounter is detected when a stylus or tip 18 of the touch probe 14 is deflected; such as for example, by one of the spheres 12a and 12b as the tip is moved into contact with the sphere 12. In one embodiment, the tip 18 is a ball tip, and in other embodiments may be any other type of stylus tip.

One suitable touch probe is a commercially available Renishaw® offset probe, which has a repeatability specifications on the order of ±0.00004 inches. Dimensions of the touch probe 14 are determined independently with any other device (e.g. a coordinate measuring machine) that can accurately measure the position of the touch probe stylus tip 18 relative to the mounting surface of the probe. Tolerances on the touch probe dimensions affect the resultant tool tip position accuracy. Therefore, accuracy of these independent measurements must be better than the required degree of accuracy of the robot, typically by an order of magnitude.

It is to be appreciated that with the present invention the joint axis positions are captured by the controller 20 when the touch probe 14 touches the sphere 12. Mathematical calibration equations, which are explained in later sections in greater detail, are then employed by the processor 21 to optimize the robot model parameters using as inputs the joint axis positions for various points on the surface of each sphere 12a and 12b determined by encounters with the touch probe. Error in this recording will influence the resulting robot parameters' optimization, but various error reduction methods can be employed. For instance, increasing the number of measurement poses will reduce the effect of random errors and touching the sphere 12 in a symmetric fashion will reduce the effect of systematic errors.

In the present invention, the robot model 37, which digitally represents the robot 10, is employed by the processor 21. Ideal Cartesian coordinates of the probe tip 18 are calculated from this model using nominal values of the model parameters. To determine actual robot model parameters and with reference made again to FIG. 1, the robot arm 8 is commanded by the controller 20 to execute a series of patterns moving the touch probe 14 towards each sphere 12a and 12b in a large number of positional poses. The joint axis positions of the robot arm 8, which are recorded when the touch probe tip 18 encounters each of the surface of the spheres 12a and 12b, are used to calculate the ideal coordinates of points on the surface of each sphere in a given coordinate system, e.g. Cartesian. If two points on the surface of the sphere are known, a straight line segment connecting those two points can be calculated. If two additional points are found, two more line segments can be determined (for a total of three line segments). Three planes that each perpendicularly bisect a different one of the three line segments will intersect at the center of the sphere. By mathematically calculating a first plane that perpendicularly bisects the first line segment, a second plane that perpendicularly bisects the second line segment, and a third plane that perpendicularly bisects the third line segment, Cartesian coordinates of each sphere center are determined. The distance between the centers of the spheres provides the length scale 28 that is independent of the robot, which avoids having to measure one of the robot link lengths in some other manner.

Figure 2:
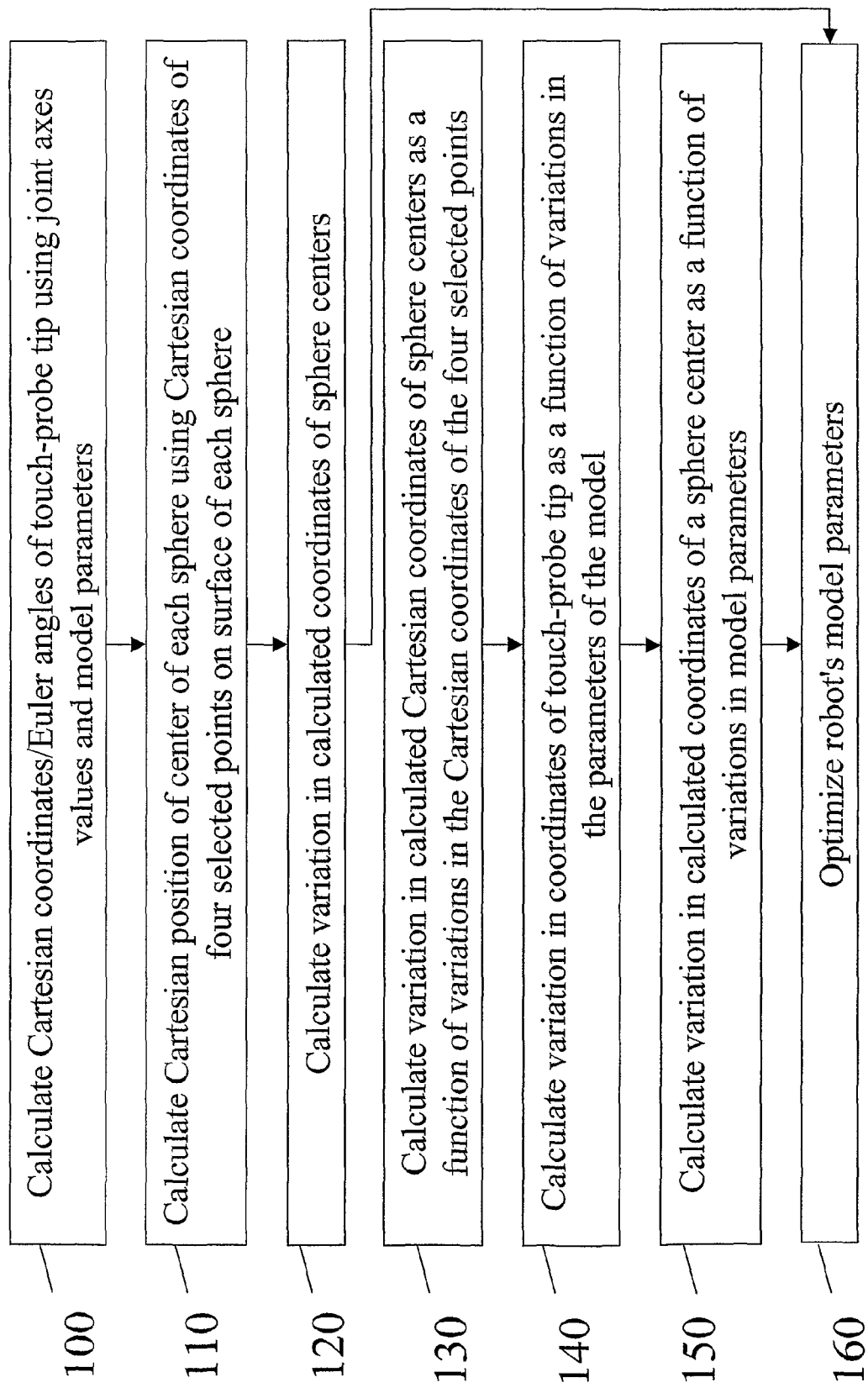
FIG. 2 is a process flow of a number of calculations performed by a processor according to the present invention.

As mentioned above, the joint axis positions of the robot arm 8 are recorded at each pose where the touch probe 14 makes contact with a surface of one of the spheres 12a and 12b. With these recorded values, a number of calculations are then performed by the processor 21 which are illustrated by FIG. 2. Generally, and as will be explained in later section in greater detail, in step 100, the processor 21 uses the model 37 to calculate the Cartesian coordinates (i.e. X, Y, Z) of the touch-probe tip using as inputs the joint axes values and model parameters (e.g. link lengths and joint offsets). Next, in step 110, the processor 21 calculates the Cartesian coordinates of the center of each sphere 12a and 12b using as inputs the Cartesian coordinates of four selected points on the surface of each sphere. In step 120, the processor 21 calculates deviations in calculated coordinates of step 110 of sphere centers from actual sphere centers, using trial values until the optimization process finds the actual centers.

Next, the processor 21 calculates the variation in the calculated Cartesian coordinates of a sphere center as a function of variations in the Cartesian coordinates of four points on the surface of the sphere in step 130. In step 140, the processor 21 calculates the variation in the coordinates of the touch-probe tip as a function of variations in the parameters of the model. In step 150, the processor 21 calculates the variation in the calculated coordinates of a sphere center as a function of variations in the model parameters from the results of step 130 and 140. In step 160, the processor 21 optimizes the robot's model parameters by minimizing the errors in sphere centers and by constraining the calculated distance between the spheres to the known length standard 18. The processor 21 uses as inputs the result of steps 120 and 150, and the joint axes positions for points on the surface of each of the two spheres for a large number of measurements on the spheres in different positional poses of the robotic arm. If the actual robot model parameters are different from the nominal values for these parameters, then the calculated "ideal" coordinates of the spheres will differ for each robot pose. It is to be appreciated that the invention determines the best-fit values for the actual model parameters that minimize the scatter in the cluster of sphere centers calculated in this manner, in effect making corrections to the nominal model parameter values.

In another embodiment, the present invention separates the touch probe dimensions from the robot model parameters. Measurements from the dial indicator 35 on the mounting faceplate 36 of the tool attachment mechanism 16 allow tilt and displacement of the mounting faceplate to be determined.

Using these measurements and the dimensions of the touch probe 14, the processor 21 calculates the robot model parameters for the end joint and removes the touch probe displacements and orientations (i.e. yaw, pitch and roll) with respect to the mounting faceplate 36 of the attachment mechanism 16.

Once the corrected model parameters are entered into the robot controller 20, the present invention will allow accurate positioning of any new tool attached to the attachment mounting faceplate 36. Tool dimensions are measured independently with, for example, a coordinate measuring machine. Mounting faceplate displacements and orientations are implemented either as a frame on the end of the robot or by transforming the tool dimensions and orientations by the mounting faceplate displacements and orientations through a matrix product and extraction of the net dimensions and orientations. If the mounting faceplate displacements and orientations are entered as a frame on the robot, then the tool frame must be implemented as a frame relative to the mounting faceplate.

Figure 3B:
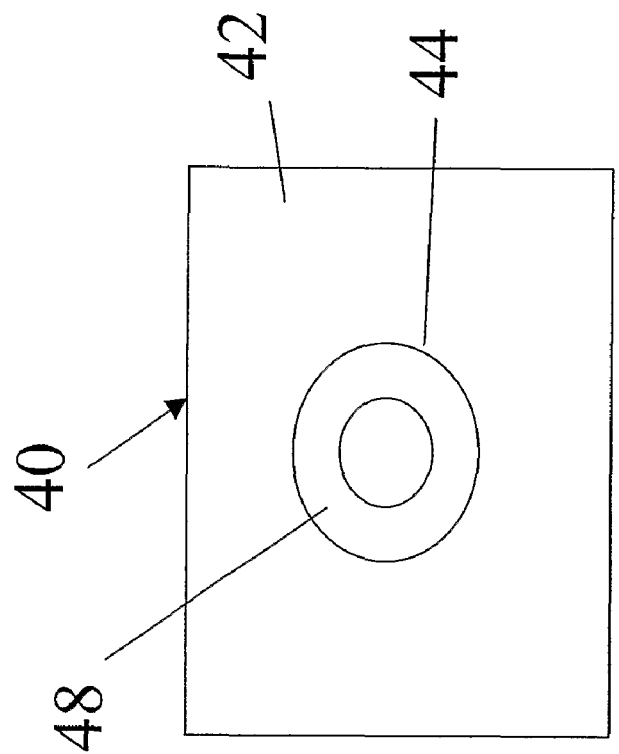
FIG. 3 is a schematic diagram of a tool attachment mechanism reference plate assembly consisting of a flat plate attached to a tool-mounting fixture according to the present invention.
Figure 3A:
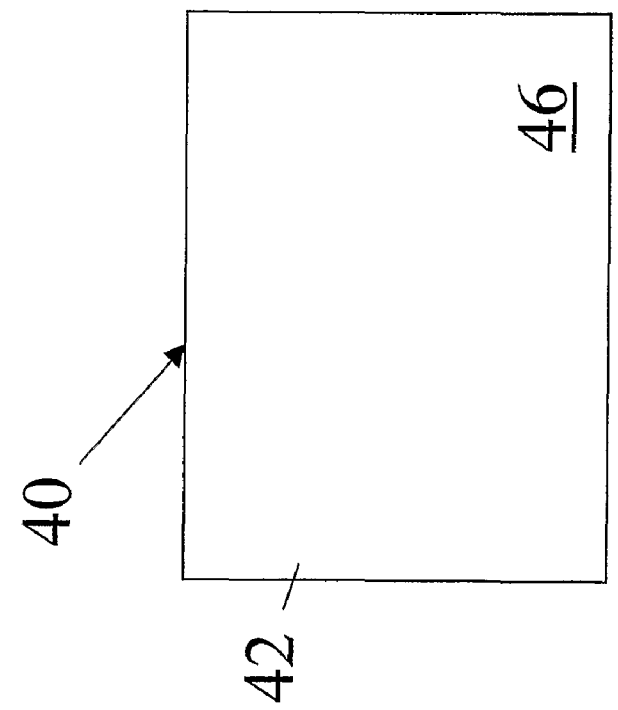

In still another embodiment, the present invention determines the model parameters for the joint farthest from the robot base and tool frame for the tool attachment mechanism 16. In this embodiment, the processor 21 performs a number of additional calculations of the results of the robot model parameter optimization described above in reference to FIG. 2, using the offset touch probe 14, the dimensions of the touch probe, and an attachment mechanism reference plate 40, which is shown by FIGS. 3A and 3B. The attachment mechanism reference plate 40 consists of a flat plate 42 providing a conventional tool-mounting fixture 44. The plate 42 is machined flat and shimmed to make a front surface 46 parallel to a mating surface 48 of the tool-mounting fixture 44. Tolerances for parallelism must be better than the required degree of accuracy for the calibration, typically by an order of magnitude. The lengths of the sides of the square plate are not critical, but the larger the dimension (assuming that the parallelism is maintained) will produce better measurements of yaw and pitch of the frame of tool attachment mechanism 16. Measurements taken from the attachment mechanism reference plate 40 attached to the attachment mechanism 16 are used to establish a coordinate system that is consistent with the tool attachment mechanism 16 found on the robot. Out-of-plane displacement, axial displacement, and twist measurements of the reference plate 40 mounted to the robot arm 8 are found by using a dial indicator or other measuring device. The processor 21 calculates yaw, pitch and roll as well as linear offsets for the mounting face 36 of the tool attachment mechanism 16 from the measurements described above and the twist measurement of the reference plate 40.

As mentioned above, the joint values of the robot, which are recorded when the controller receives the touch probe signal, are used by the processor 21 to calculate the ideal Cartesian coordinates of points on the surface of each sphere. Then the controller calculates the ideal Cartesian coordinates of each sphere center from the Cartesian coordinates of sets of four points on the surface of the sphere. These steps are described next in greater detail.

Figure 4:
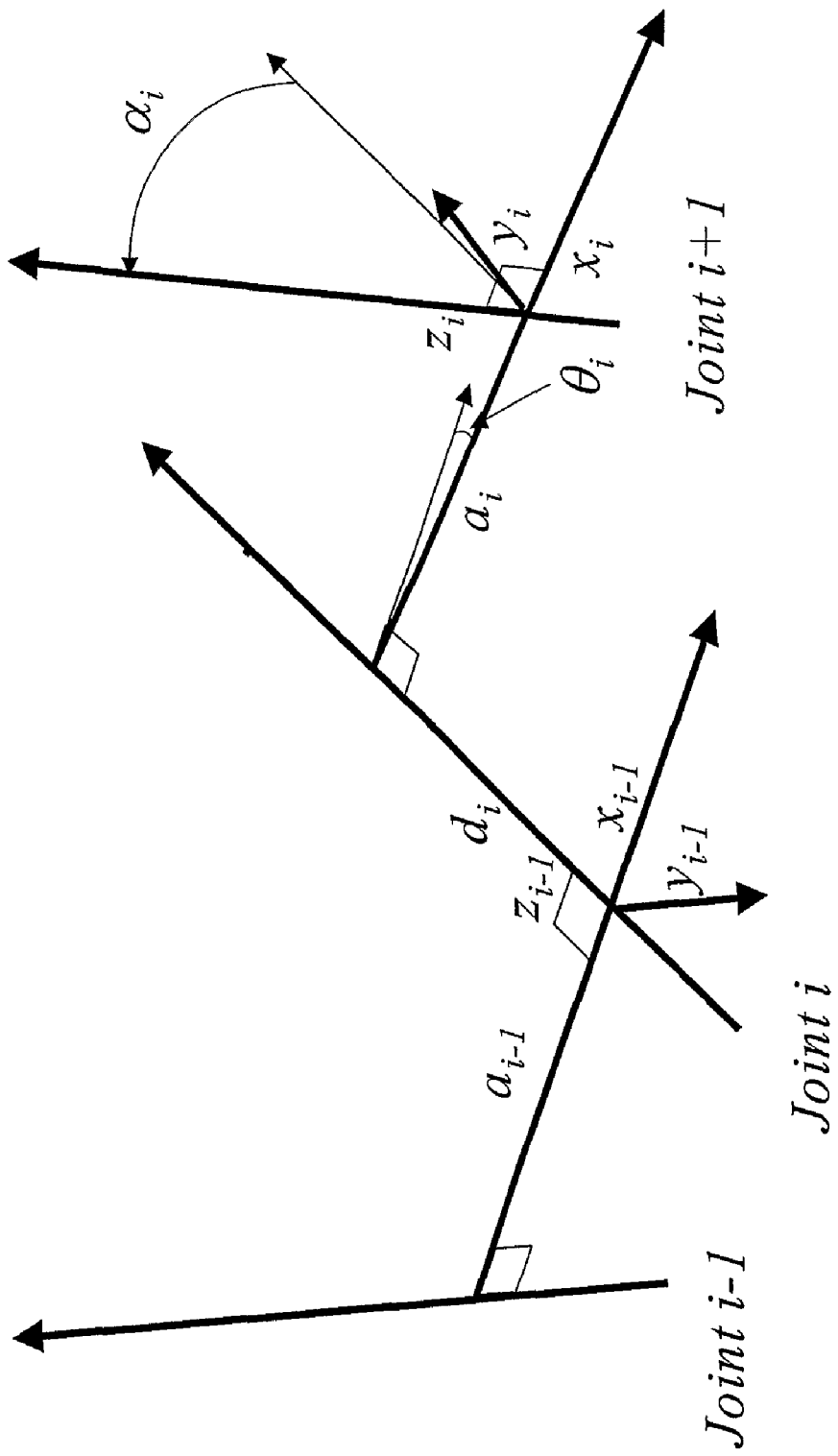
FIG. 4 is a diagram of three representative joints showing the definition of the Denavit-Hartenberg (D-H) model parameters, $a_i$, $d_i$, $\alpha_i$, and $\theta_i$, for the link between joints i and i+1.

FIG. 4 defines the Denavit-Hartenberg model parameters, $a_i$, $d_i$, $\alpha_i$, and $\theta_i$, for the link between joints i and i+1. For rotary joints, each z-axis is defined by the axis of rotation of the joint. For prismatic joints which provide linear translation of the joint, each z-axis is defined by the direction of translation. The D-H parameter $a_i$ is defined by the length of the line segment that is perpendicular to both $z_{i-1}$ and $z_i$. The x-axis, $x_i$, is defined by extending this line segment, as shown in the figure. The y-axis, $y_i$, is perpendicular to $x_i$ and $z_i$. The D-H parameter $d_i$ is the length along $z_{i-1}$ between $x_{i-1}$ and $x_i$. The twist D-H parameter, $\alpha_i$, is defined by the angle between $z_{i-1}$ and $z_i$. The rotation D-H parameter, $\theta_i$, also called the joint angle, is defined as the angle between $x_{i-1}$ and $x_i$. The two D-H parameters $a_i$ and $\alpha_i$ are constant. For rotary joints, $d_i$ is constant and $\theta_i$ varies as the joint is manipulated. For prismatic joints, $\theta_i$ is constant and $d_i$ varies as the joint is manipulated.

In the Denavit-Hartenberg model, a homogeneous transformation matrix is constructed to account for the translations and rotations for a given link between two joints due to $a_i$, $d_i$, $\alpha_i$, and $\theta_i$, respectively. Homogeneous transformation matrices are 4×4 matrix transformations that account for both rotation and translation in three dimensions through matrix multiplication.

The usual rotation matrix is the upper left 3×3 sub-matrix of the homogeneous transformation matrix, and the translation vector is contained in the upper three elements of the right-most column. The lower right element of the homogeneous matrix has a value of one for the purposes of the analysis describe herein. The transformation matrix, $M_{i-1,i}$, from frame i−1 defined by the $x_{i-1}$, $y_{i-1}$, and $z_{i-1}$ axes to frame i defined by the $x_i$, $y_i$, and $z_i$ axes, is given by the product of four matrices representing, from right to left, a rotation of $\alpha_i$ about the x axis, a translation of $a_i$ along the x axis, a rotation of $\theta_i$ about the z axis, and a translation by $d_i$ along the z axis:

$$M_{i-1,i} = \begin{bmatrix} 1 & 0 & 0 & 0 \\ 0 & 1 & 0 & 0 \\ 0 & 0 & 1 & d_i \\ 0 & 0 & 0 & 1 \end{bmatrix} \begin{bmatrix} \cos(\theta_i) & -\sin(\theta_i) & 0 & 0 \\ \sin(\theta_i) & \cos(\theta_i) & 0 & 0 \\ 0 & 0 & 1 & 0 \\ 0 & 0 & 0 & 1 \end{bmatrix} \begin{bmatrix} 1 & 0 & 0 & a_i \\ 0 & 1 & 0 & 0 \\ 0 & 0 & 1 & 0 \\ 0 & 0 & 0 & 1 \end{bmatrix} \begin{bmatrix} 1 & 0 & 0 & 0 \\ 0 & \cos(\alpha_i) & -\sin(\alpha_i) & 0 \\ 0 & \sin(\alpha_i) & \cos(\alpha_i) & 0 \\ 0 & 0 & 0 & 1 \end{bmatrix}$$

$$= \begin{bmatrix} \cos(\theta_i) & -\sin(\theta_i)\cos(\alpha_i) & \sin(\theta_i)\sin(\alpha_i) & a_i\cos(\theta_i) \\ \sin(\theta_i) & \cos(\theta_i)\cos(\alpha_i) & -\cos(\theta_i)\sin(\alpha_i) & a_i\sin(\theta_i) \\ 0 & \sin(\alpha_i) & \cos(\alpha_i) & d_i \\ 0 & 0 & 0 & 1 \end{bmatrix}$$

The complete robot model (i.e., model 37 in FIG. 1) consists of a product of the transformation matrices corresponding to all links of the robot from the base joint to the tool tip (e.g. $M_{0,1} M_{1,2} M_{2,3} \ldots M_{N-1,N}$ where N is the number of links and includes a link from the last joint to the tool tip). Cartesian coordinates and Euler angles are extracted by the present invention from the complete robot model transformation matrix. Cartesian coordinate translations are found in the upper three elements of the fourth column of the complete robot model transformation matrix, while the rotations are in the upper-left 3×3 submatrix, which can be compared to the general rotation matrix, R, to extract Euler angles.

The generalized rotation, R, can be written in matrix form:

$$R = \begin{bmatrix} \cos(\alpha)\cos(\beta) & \sin(\alpha)\cos(\beta) & -\sin(\beta) \\ -\sin(\alpha)\cos(\gamma) + \cos(\alpha)\sin(\beta)\sin(\gamma) & \cos(\alpha)\sin(\gamma) + \sin(\alpha)\sin(\beta)\sin(\gamma) & \cos(\beta)\sin(\gamma) \\ \sin(\alpha)\sin(\gamma) + \cos(\alpha)\sin(\beta)\cos(\gamma) & -\cos(\alpha)\sin(\gamma) + \sin(\alpha)\sin(\beta)\cos(\gamma) & \cos(\beta)\cos(\gamma) \end{bmatrix}$$

where $\alpha$ is a yaw rotation about z, $\beta$ is a pitch rotation about y', and $\gamma$ is a roll rotation about x''.

Figure 5:
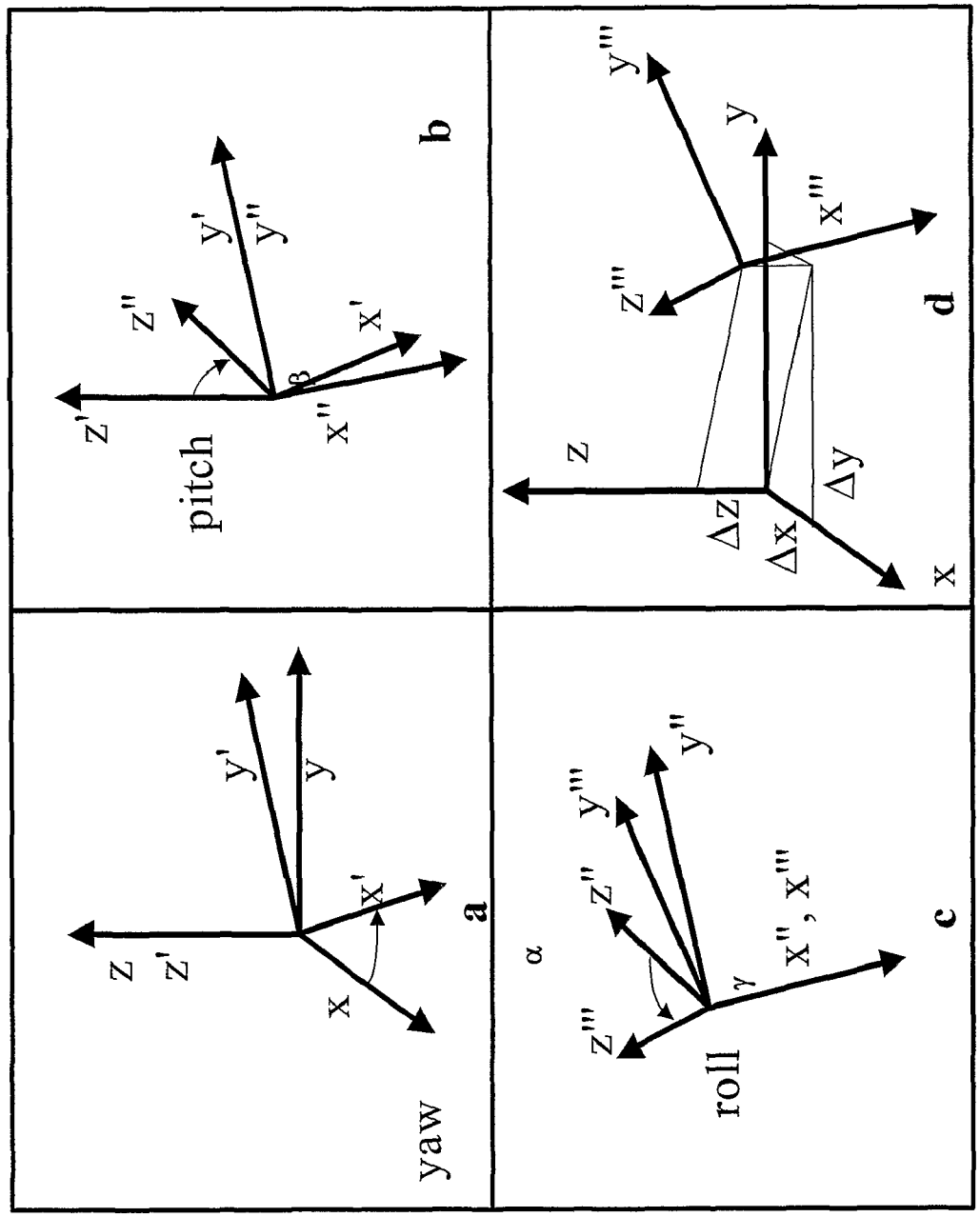
FIG. 5 is a diagram of the Cartesian coordinate positions and example Euler angles convention of a transformed frame, representing the tool frame on a robot end-effector according to the present invention.

As illustrated by FIG. 5, the Euler angles are defined as: (a): yaw, $\alpha$, a rotation about the z-axis, followed by (b): pitch, $\beta$, a rotation about the new y-axis, followed by (c): roll, $\gamma$, a rotation about the new x-axis. The Cartesian coordinates of the frame of the tool tip are: (d) translations, $\Delta x$, $\Delta y$, and $\Delta z$, along the robot base frame coordinates in the x, y and z directions, respectively.

The present invention uses this matrix to transform coordinates from the base frame (unprimed) to the rotated frame (primed) by multiplying a coordinate vector by R:

$$\vec{\tau}' = R\vec{\tau}$$

where $\vec{\tau}$ is any vector, $$\begin{bmatrix} \tau_x \\ \tau_y \\ \tau_z \end{bmatrix}$$

in the unprimed coordinates and $\vec{\tau}'$ is the same vector in the rotated frame, $$\begin{bmatrix} \tau'''_x \\ \tau'''_y \\ \tau'''_z \end{bmatrix}$$

However, it is to be appreciated that other Euler angle conventions are possible and may be used with this invention.

Figure 6:
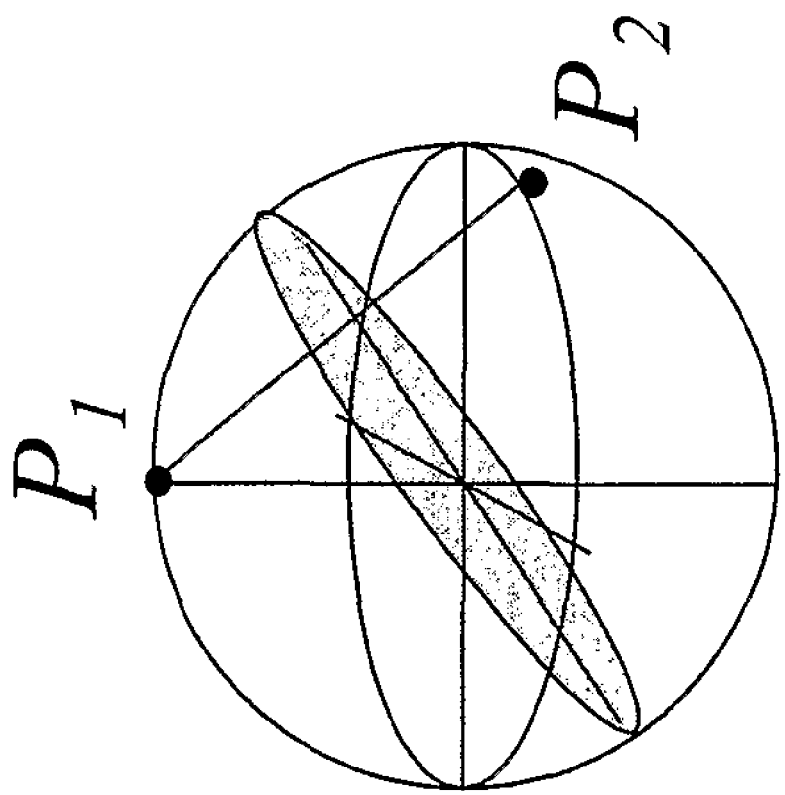
FIG. 6 is a diagram of the basis for finding equation of plane through center of sphere from points on the surface of the sphere.

Symmetry forces the center of the sphere to be in any plane that perpendicularly bisects a segment joining any two points on the surface of the sphere. If the two points on the surface of the sphere are identified by $P_1$ and $P_2$, as shown in FIG. 6, then the equation of the perpendicular bisecting plane is given by the following dot product and subsequent manipulations of the equation:

$$(\vec{P}_2 - \vec{P}_1) \circ (\vec{X} - (\vec{P}_1 + \vec{P}_2)/2) = 0$$

$$(\vec{P}_2 - \vec{P}_1) \circ \vec{X} - (\vec{P}_2 - \vec{P}_1) \circ (\vec{P}_1 + \vec{P}_2)/2 = 0$$

$$(\vec{P}_2 - \vec{P}_1) \circ \vec{X} = (\vec{P}_2 - \vec{P}_1) \circ (\vec{P}_1 + \vec{P}_2)/2$$

where $(\vec{P}_2 - \vec{P}_1)$ is the vector between $P_1$ and $P_2$, $(\vec{P}_1 + \vec{P}_2)/2$ is the vector to the midpoint of the segment, and $\vec{X}$ is the vector defining the locus of point on the perpendicular bisecting plane (i.e. $\vec{X}$ defines the collection of points on the plane). Four non-coplanar points on the surface of the sphere can be used to construct three line segments. The center of the sphere is the point of intersection of the three planes that perpendicularly bisect these segments. The equations for the three planes can be combined into one matrix equation:

$$\begin{bmatrix} \vec{P}_2 - \vec{P}_1 \\ \vec{P}_3 - \vec{P}_1 \\ \vec{P}_4 - \vec{P}_1 \end{bmatrix} \vec{X} = \begin{bmatrix} (\vec{P}_2 - \vec{P}_1) \cdot (\vec{P}_1 + \vec{P}_2)/2 \\ (\vec{P}_3 - \vec{P}_1) \cdot (\vec{P}_1 + \vec{P}_3)/2 \\ (\vec{P}_4 - \vec{P}_1) \cdot (\vec{P}_1 + \vec{P}_4)/2 \end{bmatrix}$$

This equation can be solved for $\vec{X}$ in a number of ways (e.g. matrix inversion, Cramer's rule, etc.). Appropriate selection of the points on the surface of the sphere will minimize calculation errors by ensuring that the three planes are nearly normal to each other. In the present invention, surface touch points are grouped into four-point sets that are used to calculate the center of the sphere. While three points on the surface are sufficient to defined the sphere center if the radius of the sphere and the radius of the touch probe stylus tip are known, there is uncertainty in the amount of deflection required for the touch probe to generate a pulse. This introduces both a random and systematic error in the effective distance between the center of the sphere and the center of the touch probe stylus tip. Using four points to find the center of the sphere eliminates any systematic error in this dimension.

If the actual robot model parameters are different than the nominal model parameters, then the calculated "ideal" coordinates of the sphere centers will differ for each set of four touch points. The present invention determines the best-fit values for the model parameters that minimize the scatter in the cluster of sphere centers calculated in this manner, in effect, making corrections to the nominal model parameter values.

The present invention uses a Jacobian equation, which is a linearization of the robot model 37 that quantifies the effect that variations in the model parameters have on the calculated sphere center coordinates. The Jacobian equation is constructed for a point-in-space constraint (i.e. the center of the sphere), based on joint values representing touch points on the surface of the sphere. Solving the Jacobian equation is a method of solving for the least-squares best-fit set of model parameters. The present invention finds the minimum in parameter space from differences between the actual sphere center and those calculated from the inaccurate model parameters and the recorded joint values. The present invention is iterative as the parameters are better estimated in each iteration with the subsequent Jacobian being a better estimate of the Jacobian with the best-fit set of parameters. When corrections to the coordinates of the constraint point approach zero, the routine of the present invention is considered to have converged to its best fit.

A minimization algorithm of the present invention uses a Jacobian matrix reflecting the change in Cartesian coordinates of the touch probe stylus tip 18 as a function of changes in the model parameters. In general, the Jacobian, J, is defined as follows:

$$J = \begin{bmatrix} \frac{\partial x}{\partial u_1} & \frac{\partial x}{\partial u_2} & \cdots & \frac{\partial x}{\partial u_K} \\ \frac{\partial y}{\partial u_1} & \frac{\partial y}{\partial u_2} & \cdots & \frac{\partial y}{\partial u_K} \\ \frac{\partial z}{\partial u_1} & \frac{\partial z}{\partial u_2} & \cdots & \frac{\partial z}{\partial u_K} \end{bmatrix}.$$

where $$\begin{pmatrix} x \\ y \\ z \end{pmatrix}$$

is the vector representing the touch probe tip position, $$\vec{u} = \begin{pmatrix} u_1 \\ u_2 \\ u_3 \\ \vdots \\ u_K \end{pmatrix}$$

is the vector representing the model parameters, and K is the number of model parameters. The Jacobian is a function of the joint positions (i.e. poses) of the robot 10 and can be calculated directly from the matrix equation for the model. Four "point" Jacobians, $J_{P1}$, $J_{P2}$, $J_{P3}$, and $J_{P4}$, are determined in this way for each of four touch points on the surface of a sphere. Another Jacobian is determined for the calculation of a sphere center from the sets of four points on the sphere surface. This "center" Jacobian, $J_c$, reflects the changes in the calculated sphere center Cartesian coordinates as a function of changes in the Cartesian coordinates of the four points on the sphere surface.

$$J_c = \begin{bmatrix} \frac{\partial x_c}{\partial x_1} & \frac{\partial x_c}{\partial y_1} & \frac{\partial x_c}{\partial z_1} & \frac{\partial x_c}{\partial x_2} & \frac{\partial x_c}{\partial y_2} & \frac{\partial x_c}{\partial z_2} & \frac{\partial x_c}{\partial x_3} & \frac{\partial x_c}{\partial y_3} & \frac{\partial x_c}{\partial z_3} & \frac{\partial x_c}{\partial x_4} & \frac{\partial x_c}{\partial y_4} & \frac{\partial x_c}{\partial z_4} \\ \frac{\partial y_c}{\partial x_1} & \frac{\partial y_c}{\partial y_1} & \frac{\partial y_c}{\partial z_1} & \frac{\partial y_c}{\partial x_2} & \frac{\partial y_c}{\partial y_2} & \frac{\partial y_c}{\partial z_2} & \frac{\partial y_c}{\partial x_3} & \frac{\partial y_c}{\partial y_3} & \frac{\partial y_c}{\partial z_3} & \frac{\partial y_c}{\partial x_4} & \frac{\partial y_c}{\partial y_4} & \frac{\partial y_c}{\partial z_4} \\ \frac{\partial z_c}{\partial x_1} & \frac{\partial z_c}{\partial y_1} & \frac{\partial z_c}{\partial z_1} & \frac{\partial z_c}{\partial x_2} & \frac{\partial z_c}{\partial y_2} & \frac{\partial z_c}{\partial z_2} & \frac{\partial z_c}{\partial x_3} & \frac{\partial z_c}{\partial y_3} & \frac{\partial z_c}{\partial z_3} & \frac{\partial z_c}{\partial x_4} & \frac{\partial z_c}{\partial y_4} & \frac{\partial z_c}{\partial z_4} \end{bmatrix}$$

where $x_c$, $y_c$, and $z_c$ are the coordinates of the sphere center, $x_1$, $y_1$, and $z_1$ are the coordinates of the first point on the sphere surface, $x_2$, $y_2$, and $z_2$ are the coordinates of the second point on the sphere surface, and so forth. A new Jacobian is defined, which is the product of $J_c$ and a matrix that is constructed from the four point Jacobians:

$$\hat{J} = J_c \begin{bmatrix} J_{P1} \\ J_{P2} \\ J_{P2} \\ J_{P4} \end{bmatrix}$$

The new Jacobian, $\hat{J}$, reflects the chain rule for differentiation in matrix form and quantifies the change in the Cartesian coordinates of the sphere center as a function of changes in the robot model parameters.

A large number of sphere centers and the corresponding matrices, $\hat{J}$, are determined in this way for a variety of robot poses for each sphere. The poses are selected to maximize the range of motion of each joint, which maximizes the envelope of applicability of the model parameter results. The Jacobians, $\hat{J}$, for these poses are then combined and processed in a manner generalized from a ball-in-socket mechanism procedure. See Marco Antonio Meggiolaro, "Achieving Fine Absolute Positioning Accuracy in Large Powerful Manipulators", Doctoral Thesis, MIT, September 2000, and the disclosure of which is herein incorporated by reference.

It is known to use a ball-in-socket mechanism on the robot end-effecter. The center of the ball is stationary and independent of robot pose. This constraint allows the robot to be used in its own calibration; however, a ball-in-socket mechanism is difficult to implement on a motorized robot. Robot positioning errors due to incorrect model parameters will produce strain in the robot as it is moved into different poses. For large, powerful robots, of the type commonly used in manufacturing companies, the inherent inaccuracy in the robots likely would tear apart the ball-in-socket mechanism, or at the least, would cause unnatural strains in the robot joints. The present invention overcomes this problem by using measured points on the surface of each of two spheres to calculate a stationary point at the center of each sphere.

The Jacobians, $\hat{J}$, for these poses are then combined, as described below. A column vector, $\Delta \vec{X}$, is created comprising the difference between the Cartesian coordinates for the centers of the spheres determined from the touches on the surface, and the actual centers of the spheres, these three-vectors being stacked to create a column vector. As used herein, the "c" subscript indicates the center coordinate determined from touches on the sphere surface. In addition, the "c" subscript is followed by the index of the center, where L is the total number of centers being calculated (i.e. sets of four touch points), half of which are for the first sphere (above the horizontal line in the vector), and half of which are for the second sphere (below the line). Also as used herein, the subscripts "a1" and "a2" indicate the actual sphere center coordinates for the two spheres, respectively, which are unknown. The vector is as follows:

$$\Delta \vec{X} = \begin{bmatrix} x_{c,1} - x_{a1} \\ y_{c,1} - y_{a1} \\ z_{c,1} - z_{a1} \\ \vdots \\ x_{c,L/2} - x_{a1} \\ y_{c,L/2} - y_{a1} \\ z_{c,L/2} - z_{a1} \\ x_{c,L/2+1} - x_{a2} \\ y_{c,L/2+1} - y_{a2} \\ z_{c,L/2+1} - z_{a2} \\ \vdots \\ x_{c,L} - x_{a2} \\ y_{c,L} - y_{a2} \\ z_{c,L} - z_{a2} \end{bmatrix} = \vec{X}_c - \vec{X}_a$$

In order to find the best-fit solution the following equation must be solved:

$$\Delta \vec{X} = \begin{bmatrix} \hat{J}_1 \\ \vdots \\ \hat{J}_{L/2} \\ \hat{J}_{L/2+1} \\ \vdots \\ \hat{J}_L \end{bmatrix} \vec{\varepsilon}$$

where, $\vec{\varepsilon}$ is the vector of errors, or corrections, to the model parameters, and the subscript on each $\hat{J}$ is an index for sphere center; each Jacobian is evaluated for each set of four touch points.

This equation is modified to allow the processor 21 to calculate the actual center of each sphere at the same time as the model parameters are calculated. The present invention accomplishes this for the two spheres by appending to the right hand side of each Jacobian, $\hat{J}$, a 3×3 identity matrix, I, and then a 3×3 null matrix, O, when calculating the first sphere center, or appending a 3×3 null matrix and then a 3×3 identity matrix when calculating the second sphere center. Next, these modified matrices are stacked, as described above to create a new Jacobian, $\tilde{J}$. These last two steps are illustrated in the following equation:

$$\tilde{J} = \begin{bmatrix} \hat{J}_1 & I & O \\ \vdots & \vdots & \vdots \\ \hat{J}_{L/2} & I & O \\ \hat{J}_{L/2+1} & I & O \\ \vdots & \vdots & \vdots \\ \hat{J}_L & O & I \end{bmatrix}$$

The present invention at this point, splits the actual sphere centers into trial sphere centers plus a correction term:

$$\Delta \vec{X} = \begin{bmatrix} x_{c,1} - x_{a1} \\ y_{c,1} - y_{a1} \\ z_{c,1} - z_{a1} \\ \vdots \\ x_{c,L/2} - x_{a1} \\ y_{c,L/2} - y_{a1} \\ z_{c,L/2} - z_{a1} \\ \hline x_{c,L/2+1} - x_{a2} \\ y_{c,L/2+1} - y_{a2} \\ z_{c,L/2+1} - z_{a2} \\ \vdots \\ x_{c,L} - x_{a2} \\ y_{c,L} - y_{a2} \\ z_{c,L} - z_{a2} \end{bmatrix} =$$

$$\begin{bmatrix} x_{c,1} - x'_{a1} - \delta x_{a1} \\ y_{c,1} - y'_{a1} - \delta y_{a1} \\ z_{c,1} - z'_{a1} - \delta z_{a1} \\ \vdots \\ x_{c,L/2} - x'_{a1} \delta x_{a1} \\ y_{c,L/2} - y'_{a1} \delta y_{a1} \\ z_{c,L/2} - z'_{a1} \delta z_{a1} \\ \hline x_{c,L/2+1} - x'_{a2} - \delta x_{a2} \\ y_{c,L/2+1} - y'_{a2} - \delta y_{a2} \\ z_{c,L/2+1} - z'_{a2} - \delta z_{a2} \\ \vdots \\ x_{c,L} - x'_{a2} - \delta x_{a2} \\ y_{c,L} - y'_{a2} - \delta y_{a2} \\ z_{c,L} - z'_{a2} - \delta z_{a2} \end{bmatrix} = \begin{bmatrix} x_{c,1} - x'_{a1} \\ y_{c,1} - y'_{a1} \\ z_{c,1} - z'_{a1} \\ \vdots \\ x_{c,L/2} - x'_{a1} \\ y_{c,L/2} - y'_{a1} \\ z_{c,L/2} - z'_{a1} \\ \hline x_{c,L/2+1} - x'_{a2} \\ y_{c,L/2+1} - y'_{a2} \\ z_{c,L/2+1} - z'_{a2} \\ \vdots \\ x_{c,L} - x'_{a2} \\ y_{c,L} - y'_{a2} \\ z_{c,L} - z'_{a2} \end{bmatrix} - \begin{bmatrix} \delta x_{a1} \\ \delta y_{a1} \\ \delta z_{a1} \\ \vdots \\ \delta x_{a1} \\ \delta x_{a1} \\ \delta z_{a1} \\ \delta x_{a2} \\ \delta y_{a2} \\ \delta z_{a2} \\ \vdots \\ \delta x_{a2} \\ \delta y_{a2} \\ \delta z_{a2} \end{bmatrix} = \Delta \vec{X}_c - \delta \vec{X}_a$$

where the prime indicates trial values that are adjusted in each iteration of the solution, and the δ values represent correction terms. The left most equation is repeated from above for clarification. The next equation shows the split of the actual sphere centers into a trial term and a correction term. The next equation shows how the correction vector is separated from the other vector, and the final equation writes the result in a convenient form. The best-fit equation is then modified as follows:

$$\Delta \vec{X} = \delta \vec{X}_c - \delta \vec{X}_a = \begin{bmatrix} \hat{J}_1 \\ \vdots \\ \hat{J}_{L/2} \\ \hat{J}_{L/2+1} \\ \vdots \\ \hat{J}_L \end{bmatrix} \vec{\varepsilon}$$

$$\Delta \vec{X}_c = \begin{bmatrix} \hat{J}_1 \\ \vdots \\ \hat{J}_{L/2} \\ \hat{J}_{L/2+1} \\ \vdots \\ \hat{J}_L \end{bmatrix} \vec{\varepsilon} + \delta \vec{X}_a = \begin{bmatrix} \hat{J}_1 & I & O \\ \vdots & I & O \\ \hat{J}_{L/2} & I & O \\ \hat{J}_{L/2+1} & O & I \\ \vdots & O & I \\ \hat{J}_L & O & I \end{bmatrix} \begin{bmatrix} \vec{\varepsilon} \\ \delta x_{a1} \\ \delta y_{a1} \\ \delta z_{a1} \\ \delta x_{a2} \\ \delta y_{a2} \\ \delta z_{a2} \end{bmatrix} = \tilde{J} \vec{\varepsilon}'$$

$$\Delta \vec{X}_c = \tilde{J} \vec{\varepsilon}'$$

where the first line shows the original best fit equation again, the second line shows how the correction vector, $\delta \vec{X}_a$, is incorporated into a generalized error vector, $\vec{\varepsilon}'$, and the last equation shows the resulting matrix equation in simpler notation. The final matrix equation is solvable by multiplying both sides of the equation by the pseudoinverse of $\tilde{J}$:

$$\tilde{J}^{\#} \Delta \vec{X}_c = \vec{\varepsilon}'$$

where $\tilde{J}^{\#}$ is the pseudoinverse of $\tilde{J}$:

$$\tilde{J}^{\#} = (\tilde{J}^t \tilde{J})^{-1} \tilde{J}^t$$

and $\tilde{J}^t$ is the transpose of $\tilde{J}$. The solution is a set of corrections to the model parameters, $\vec{\epsilon}$, and to the trial Cartesian coordinates of the sphere centers: ($\delta x_{a1}$, $\delta y_{a1}$, $\delta z_{a1}$), and ($\delta x_{a2}$, $\delta y_{a2}$, $\delta z_{a2}$).

Folding these corrections back into both the model and the trial sphere centers allows this process to be iterated, resulting ultimately in the least-squares best-fit model parameters for this set of measurements. Iteration is necessary since the Jacobian formulation is a linearization of the actual robot. The closer the model parameters and trial sphere centers are to their actual values; the better will be the resulting calculations. Iteration allows the model parameters and sphere centers to approach their actual values, which results in a Jacobian formulation that is progressively better with each iteration. The resulting optimized model parameters and sphere centers minimize the scatter in centers of each sphere for the points found on the surface of the spheres. In other words, this approach minimizes the difference between the actual sphere centers and the centers determined from the optimized model parameters and the joint values captured on the sphere surface.

There are generally some model parameters that are not independent, one solution of which is to remove appropriately selected columns from the Jacobian prior to performing the pseudo-inverse. Corresponding elements of the error vector $\vec{\epsilon}$ must also be removed. In addition, if steps are not taken to constrain a selected link length in the algorithm, then a trivial solution results: the "optimized" model parameters are found to be equal to the nominal values, and the "actual" sphere center is determined to reside at the robot base frame origin.

As described above, the known distance between the two spheres 12a and 12b provides the length scale 28 (FIG. 1). The present invention described herein implements scaling by first removing a column of the Jacobian matrix and a corresponding element of the error vector associated with a selected link length of the robot, which makes this link length an independent variable not subject to optimization. The processor 21 uses the best-fit routine described above to calculate the best-fit model parameters and center positions for the two spheres with a resultant distance between the spheres. The selected link length is then adjusted by the processor 21 and the processor runs the best-fit routine again until the calculated distance between the two spheres matches the known distance. The result is a set of optimized model parameters that provides the correct distance between the spheres.

The approach described above, and other approaches to robot calibration, have difficulty in determining model parameters for the joint farthest from the robot base, the "end joint". The method of the present invention described thus far provides model parameters that include the touch probe as if it were an integral part of the robot (i.e. part of the end joint). Additional steps are then used by the processor 21 to separate the touch probe dimensions from the robot model parameters. This is useful for applications that require the interchange of tools since the present invention makes it possible for not needing to re-calibrate the robot for every tool change.

In the plate embodiment described above, the end-joint angular offset determined from the optimization scheme also described above is used as the end-joint offset for the robot provided that a frame is defined for the attachment mechanism that removes (or accounts for) the angular offset for the touch probe tip as well as accounting for the other attachment mechanism parameters. Additional measurements on the tool attachment mechanism and a reference plate, recorded by the processor 21 as the end-joint is rotated and manipulated, allow the tilt and displacement of this mounting face to be determined. These measurements, together with touch probe dimensions and outputs from the Jacobian methodology described above, are used by the processor 21 to calculate the remaining robot model parameters for the end joint and additional parameters for the attachment mechanism with respect to the end joint. These final steps are described below.

With reference made again to FIG. 1, once the model parameter optimization routine has been run by the processor 21 as described above, the coordinates of the touch probe tip are known relative to the robot base frame, and the touch probe is removed from the robot. The reference plate 40 (FIG. 3) is then mounted to end of the robot arm 10. The appropriate robot model parameters, which were found above, are entered into the controller 20 and the robot arm 8 is positioned in a convenient spot and orientation (e.g. yaw, pitch and roll each at zero degrees) for additional measurements on the reference plate 40. Out-of-plane run-out measurements are taken on the reference plate 40 using, for example, dial indicator 35 at angular intervals as the end joint 6 is rotated through 360 degrees. The magnitude and phase of these measurements are then determined by fitting a sine function to the collected data. The tilt angle of the reference plate 40 (and consequently the tilt angle of the attachment mechanism face 36), $\mu$, is found using the magnitude of the run-out or out of plane tilt measurement d and the radius r at which the run-out measurements are made (i.e. the radius from the axis of rotation of the end joint):

$\mu = \tan^{-1}(d/r)$.

Figure 7:
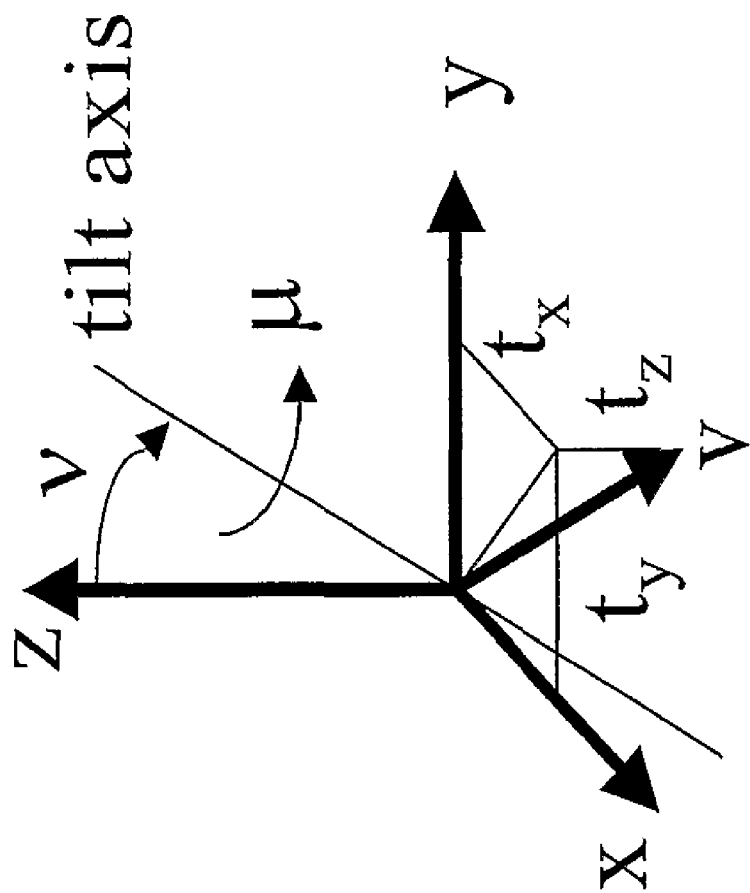
FIG. 7 is a diagram of vector normal to reference plate showing angles of tilt and axis of rotation of this tilt angle.

The phase of the sine function is used to define the axis about which the normal to the reference plate 40 is tilted. The tilt axis is perpendicular to the axis of the end joint 6 and is specified by an angle of rotation, $v$, of tilt axis about the end joint axis where $v$ is equal to the phase, as illustrated by FIG. 7, which diagrams the tilt, tilt angle ($\mu$), tilt axis, and the angle of the tilt axis ($v$). As shown, the x, y and z-axes define the frame of the end joint. The unit vector $v$ represents the normal to the reference plate. This normal is tilted from the x-axis (i.e. axis of rotation of the end-joint) by an angle $\mu$ about an axis of rotation shown in the diagram. The tilt axis of rotation is in the y-z plane and is rotated about the x-axis by an angle $v$. $t_x$, $t_y$, and $t_z$, are the components of $v$ in the end-joint frame.

The tilt angle and angle of the tilt axis are sufficient to solve for the unit normal vector to the reference plate 40 in end-joint frame coordinates ($t_x$, $t_y$, $t_z$).

$t_x = \cos(\mu)$ $t_y = \sin(\mu)\cos(v)$ $t_z = \sin(\mu)\sin(v)$

Yaw ($\alpha$) and pitch ($\gamma$) can be extracted from this normal vector with simple trigonometric calculations:

$\gamma = \sin^{-1}(-t_z)$ $\alpha = \tan^{-1}(t_y/t_x)$

Roll must be determined with additional steps, described below.

Determination of displacement of the attachment mechanism faceplate 36 in a plane perpendicular to the axis of rotation of the end joint 6 is accomplished with similar run-out measurements, this time on the outside of a cylindrical surface typically found on an attachment mechanism 16. It is to be appreciated that this cylindrical surface is centered on the attachment mechanism 16 to provide tool alignment. Displacement is plotted as a function of end joint angle, and a sine function is fit to the data. The magnitude of this sine function establishes the magnitude of displacement, and the phase gives the angle of that displacement about the end joint axis of rotation. Roll is determined in the next step.

At this point, robot parameters have been determined, which include the touch probe 14 as if the probe were a part of the robot arm 8. When these model parameters have been entered into the controller 20 and the robot arm 8 is positioned in some given orientation then the touch probe tip 18 (if it was mounting on the robot) is in a known location and orientation relative to the robot coordinate frame. For instance, for robot yaw, pitch and roll each at zero degrees, the probe 14 will be oriented so that the probe tip offset 38 is in, say, the z-direction relative to the robot base frame. Since the offset 38 of the touch probe tip 18 will not be aligned with the attachment mechanism 16 in any particular orientation, these robot model parameters will not naturally align the attachment mechanism to the robot, which is important for applications requiring interchange of tools. The present invention in this step finds the roll angle that aligns the attachment mechanism frame (its local z-axis) with the robot z-axis. Dial indicator measurements on the edge of the reference plate 40 taken as the robot arm 8 is moved up and down vertically indicates the twist angle that this edge makes with the robot vertical axis about the axis of rotation of the end joint 6.

It is to be appreciated that off-line measurements on the edge of the plate 40 will indicate the twist of the edge relative to the attachment mechanism frame. In one embodiment, the present invention uses a tool attachment mechanism coupled to the conventional tool-mounting fixture 44 provided on reference plate 40. The tool attachment mechanism used is identical to that found on the robot end joint 6. This mounting fixture assembly defines the coordinate system for measurements relative to the mounting surfaces of the attachment mechanism, such as measured by a coordinate measuring machine (CMM). The y-z plane is aligned with the horizontal mating surface of the attachment mechanism, with the x-axis centered on the axis of the alignment cylinder found on this mechanism. The z-axis is aligned with some feature on the attachment mechanism such as an alignment pin. The roll of the robot attachment mechanism is the difference between the twist angle of the reference plate measured on the robot and the twist angle measured on the reference plate relative to the mounting fixture.

Incorporating these findings into a frame for the attachment mechanism requires calculating the offset and orientation of the attachment mechanism faceplate relative to the end joint frame. Orientation (yaw, pitch and roll) comes directly from the steps outlined above. Offsets in the y and z-axes are equal to the magnitude of the off-axis displacement times the sine or cosine of the displacement angle, respectively. The offset in the x-axis, $\Delta x$, is derived from the robot model parameters found earlier, which have the touch probe dimensions embedded in them. $\Delta x$ is the length along the end-joint axis of rotation from the origin of the end-joint frame to the mounting face of the attachment mechanism. A mathematical transformation is performed by the processor 21 to calculate $\Delta x$ from the length to the probe tip, touch probe dimensions and the attachment mechanism orientation and offsets. This transformation results in the following equation:

$$\Delta x = d - \{x_p \cos(\alpha)\cos(\beta) + y_p[-\sin(\alpha)\cos(\gamma) + \cos(\alpha)\sin(\beta)\sin(\gamma)] + z_p[\sin(\alpha)\sin(\gamma) + \cos(\alpha)\sin(\beta)\cos(\gamma)]\} - \Delta x_0$$

where d is the distance found from the model parameter optimization routine to the touch probe tip along the axis of rotation of the end joint, and $\Delta x_0$ is the nominal offset stored in the robot controller for the distance to the robot end joint faceplate (without the attachment mechanism) along the axis of rotation of the end joint frame, and $x_p$, $y_p$, and $z_p$ are the touch probe tip offsets determined by measurements relative to the mounting fixture. All other symbols are previously defined above. Again, this expression is derived from the matrix product of a generalized rotation with yaw, pitch and roll times a vector with coordinates ($x_p$, $y_p$, and $z_p$).

Once the corrected model parameters are entered into the controller 20, the present invention provides accurate positioning of any new tool mounted to the attachment mechanism. Tool dimensions may be measured independently with a coordinate measuring machine relative to the mounting fixture. Attachment mechanism displacements and orientations are implemented either as a frame on the end of the robot or by transforming the tool dimensions and orientations by the attachment mechanism displacements and orientations. This later step is accomplished through a product of the homogeneous transformation matrices that represent the frame of the attachment mechanism and the frame of the tool, respectively, with the net dimensions and orientations of the tool/attachment mechanism combination frame being extracted from the resulting transformation matrix. Alternatively, if the attachment mechanism displacements and orientations are entered as a separate frame on the robot, then the tool frame must be implemented as a frame relative to the attachment mechanism frame. Each method is mathematically equivalent, the decision of which method to use being constrained by the capabilities of the controller in use (i.e. the controller software may not allow relative tool frames).

FIGS. 8A, 8B, and 8C show the effect on tool location that can result when using nominal model parameters to position the tool compared to using an optimal set of model parameters as provided for by the present invention. Compensation can generally be made for systematic errors or shifts in tool tip location using user frames. Errors that depend on pose can only be removed using optimal model parameters. Note that the overall robot accuracy for any pose cannot be better than robot repeatability.

Each scatter plot in FIGS. 8A, 8B, and 8C shows the Cartesian coordinates for the center of a sphere determined from touches on the surface of the sphere with the robot in a variety of poses. The process of finding the sphere center was described above. Since the shown data points are for a single sphere, the data points should cluster about the actual sphere center position. When using an incorrect set of model parameters the coordinates of the sphere center (and equivalently, the tool tip position) depend dramatically on the pose of the robot. In this case, nominal model parameters produced a large scatter 200, 210, 220 in the measured centers as shown in FIGS. 8A, 8B, and 8C, respectively. On the other hand, optimal model parameters produced a tight clustering 230, 240, 250 of the positions as also shown in FIGS. 8A, 8B, and 8C, respectively. Notice that the nominal model parameters give a large clustering of points compared to the optimal model parameters. Also, notice that the nominal parameters produce a relatively large systematic shift in the centroid of the measurements away from the optimal model parameter data. These plots establish the importance of using accurate model parameters for robot positioning accuracy. The same conclusion is true for orientation accuracy.

In one experimental test, the positional accuracy of the system was required to be on the order of 0.010 inches. The demonstration was conducted on a six-axis, rotary jointed robot, such as robot 10 illustrated by FIG. 1, on which the joint angle offsets were set to zero and is commercially available from Stäubli Corporation, Duncan, S.C., and sold as a Model RX. Robot 10 has a quoted repeatability of ±0.0016 inches (±0.04 mm). The calibration fixture used commercially available 2-inch diameter spheres 12a and 12b with sphericity specifications of ±0.0002 inches. Joint angle positions were collected for 108 sets of four points on the surface of each sphere for a total of 864 touches of the touch probe to the spheres and 216 calculated sphere centers values. Optimal values for the model parameters and actual coordinates of the sphere centers were calculated. Using nominal values for the model parameters, the standard deviation of the difference between the "measured" coordinates for the centers of the spheres (from the touches of the spheres) and the average of these centers was found to be, for the respective coordinates: x: 0.039 inches, y: 0.065 inches, and z: 0.078 inches.

FIG. 9 shows a plot of the scatter in sphere centers about the average center positions for the different poses without optimization. As a result of optimization over a full set of parameters, the standard deviation of center residuals (the difference between the "measured" centers using the optimized parameters and the actual sphere centers found during optimization), for the respective coordinates, was found to be: x: 0.0019 inches, y: 0.0015 inches, and z: 0.0024 inches, an improvement by at least a factor of 20. A full set of optimization parameters consists of a set of independent parameters. Dependent parameters cannot be resolved in this method.

FIG. 10 shows a plot of the scatter in center positions after optimization over a full set of parameters using the same set of measurements. It should be noted that the standard deviation of center residuals for the optimized run represents the uncertainty in calculated sphere centers, which are determined from sets of four points on the surface of each sphere. To be more relevant, it is important to know what the uncertainty is in positioning the probe tip (i.e. probe positioning error or uncertainty), which can be calculated from the center Jacobian matrix:

$$(\Delta x_c)^2 = \left(\frac{\partial x_c}{\partial x_1}\right)^2 (\Delta x_1)^2 + \left(\frac{\partial x_c}{\partial y_1}\right)^2 (\Delta y_1)^2 + \ldots + \left(\frac{\partial x_c}{\partial z_4}\right)^2 (\Delta z_4)^2$$
$$= J_{c1,1}^2 (\Delta x_1)^2 + J_{c1,2}^2 (\Delta y_1)^2 + \ldots + J_{c1,12}^2 (\Delta z_4)^2$$

where $\Delta x_c$ is the uncertainty in the x coordinate of the center of the sphere; $x_c$ is the x-axis center coordinate; $x_1, y_1, \ldots z_4$ are the coordinates of the four touch points on the surface of the spheres, respectively, with associated uncertainties, $\Delta x_1, \Delta y_1, \ldots \Delta z_4$; and $J_c 1,i$ is the variation in $x_c$ resulting from variation in the ith coordinate on the sphere surface (i=1, 2, 3, 4, 5, ... 12 for $x_1, y_1, z_1, x_2, y_2, \ldots z_4$, respectively). Assuming the probe tip uncertainties ($\Delta x_1, \Delta y_1, \Delta z_1, \Delta x_2, \Delta y_2, \ldots \Delta z_4$) are all equal and letting this uncertainty be represented by $\Delta$, then the following must hold:

$$(\Delta x_c)^2 = J_{c1,1}^2 \Delta^2 + J_{c1,2}^2 \Delta^2 + \ldots + J_{c1,12}^2 \Delta^2$$
$$= (J_{c1,1}^2 + J_{c1,2}^2 + \ldots + J_{1,12}^2) \Delta^2$$

This equation can be inverted to solve for $\Delta$:

$$(\Delta)^2 = (\Delta x_c)^2 / (J_{1,1}^2 + J_{1,2}^2 + \ldots + J_{1,12}^2)$$

Similar expressions can be derived for the y and z components. Each center residual (difference between actual and calculated sphere center) provides an estimate of $\Delta x_c$, from which an estimate is made for $\Delta^2$. All $\Delta^2$'s can be averaged to arrive at a total variance for probe positioning errors. Pooling data from all poses and all directions (x, y, and z) gives a standard deviation for probe tip positioning error of 0.0017 inches for the measurements in FIG. 10.

In another embodiment, the present invention is performed on a subset of the model parameters, which is helpful since motorized robots must be able to perform reverse-kinematics calculations. Reverse-kinematics is much simpler if only the nominally nonzero link lengths and the joint offsets are optimized, leaving all other parameters fixed. However, in this case, actual errors in parameters that are not optimized may be folded into parameters that are being optimized. Optimization will reduced the positioning errors for the measurements being taken (i.e. for the touch probe), but there may be orientation errors that could produce additional positional errors when using tools of different dimensions than the touch probe.

In one experimental test, with the processor 21 using the above measurements from the previous experimental test, the processor 21 optimized a reduced set of model parameters, wherein the standard deviation of the center residuals became, for the respective coordinates: x: 0.0026 inches, y: 0.0035 inches, and z: 0.0040 inches. Likewise, probe tip positioning error was found to be 0.0031 inches. FIG. 11 shows a plot of the scatter in sphere centers for the different poses after optimization over a partial set of parameters. Obviously, optimizing on a partial set of parameters does not do as well at minimizing errors as does optimizing on a full set of parameters as illustrated by FIG. 10; however, there is still a tremendous improvement over no correction as illustrated by FIG. 9.

In the experimental tests, the present invention also provided information on the maximum deviations of the centers. For the nominal parameters, the maximum absolute deviations of the measured centers from the average centers were found to be: x: 0.099 inches, y: 0.139 inches, and z: 0.162 inches. For the full set of optimized parameters, the maximum absolute deviations were found to be: x: 0.0073 inches, y: 0.0043 inches, and z: 0.0060 inches. For the partial set of optimization parameters, the maximum deviations were found to be: x: 0.0083 inches, y: 0.010 inches, and z: 0.012 inches. Again, the fall set of optimized parameters performs best with respect to this metric, but there is still a remarkable improvement over the uncorrected data when using a partial set of parameters. This test clearly demonstrates the advantage of accuracy calibration.

In another experimental test of the present invention, a partial set of model parameters obtained for the robot was entered into the controller software for measurement of the attachment mechanism frame. The partial set of parameters was actually a subset of the full set of parameter values found from a full parameter optimization. A partial optimization was not used. The touch probe was dimensioned on a CMM making use of the CMM mounting fixture. The twist of the attachment mechanism reference plate was also determined using a CMM and the mounting fixture. Out-of-plane run-out measurements were made with a dial indicator at 12 points on the tool attachment mechanism reference plate mounted on the robot as the end joint 6 (FIG. 1) was rotated through 360 degrees (see FIG. 12 where out-of-plane displacement of the dial indicator is a function of angle of rotation of the joint). Displacement measurements were also made on 12 points on the outside of a cylindrical surface on the attachment mechanism, again as end joint 6 was rotated through 360 degrees (see FIG. 13 where axial displacement of the dial indicator is a function of angle of rotation of the joint). Twist measurements were taken on the side of the attachment mechanism reference plate as the robot arm was translated down in eight 0.9-inch increments (see FIG. 14 where displacement of the dial indicator is a function of position along the reference plate edge). Also shown in this last plot is the expected displacement along the edge of the reference plate due to twist of the reference plate with respect to the attachment mechanism as measured on the CMM mounting fixture (0.315 degrees twist).

With all of this data, the processor 21 calculated the frame for the attachment mechanism. This attachment mechanism frame was loaded into the robot controller as a tool frame. Out-of-plane run-out measurements were then taken at 12 points on the attachment mechanism reference plate as the robot was manipulated through a roll of 360 degrees (see FIG. 15 where out-of-plane displacement of the dial indicator is a function of roll angle). This was done to make the robot rotate in the plane of the attachment mechanism face. The run-out measurements are considerably smaller indicating that the process is working properly. Similarly, displacement measurements were made on the outside of the attachment mechanism cylindrical surface as the robot was manipulated through a roll of 360 degrees (see FIG. 16 where axial displacement of the dial indicator is a function of roll angle). Again, this should cause the robot to rotate about the central axis of the attachment mechanism, and the measurements are considerably smaller indicating that the process is working properly. Finally, the roll was checked by manipulating the robot vertically with a dial indicator measuring displacement of the edge of the attachment mechanism reference plate (see FIG. 17 where the displacement of the dial indicator is a function of translation in robot Z. Also note, that the diagonal dashed line indicates the expected displacement because the reference plate edge is twisted relative to the attachment mechanism as measured via the CMM). The data points fit the dashed line indicating that the process is working properly.

For the experimental test, initial measurements on the attachment mechanism showed the tilt of the reference plate to be 0.0055 inches at a measurement radius of 3.75 inches. This is an angle of 0.084 degrees. After adjusting for the calculated frame, the tilt was measured at 0.0009 inches at the same 3.75-inch radius, for an angle of 0.015 degrees. For a 20-inch long tool, the tip displacement for this frame would be only 0.005 inches from ideal, one-sixth of the uncorrected displacement. Initial off-axis displacement measurements showed the attachment mechanism to be shifted 0.0113 inches off center. After entering the correction, the displacement was measured at 0.0026 inches. Finally, the initial twist angle measured on the side of the reference plate was near zero degrees, but the twist of the reference plate measured with the CMM was 0.315 degrees. After entering the correction to roll, the twist of the reference plate was found to be 0.262 degrees measured with the CMM, with a difference of 0.053 degrees from ideal. These three measurements show a significant improvement for attachment mechanism errors. Accordingly, the above mentioned experimental tests have shown the value of the present invention in finding model parameters and the attachment mechanism frame that result in improved accuracy as reflected in reduced scatter in the measured sphere centers and reduced tilt, twist and displacement of a tool.

In another embodiment illustrated by FIGS. 18, 19, and 20, the present invention is a hybrid of the two approaches defined above with the advantages of both and without their disadvantages. This embodiment uses an inexpensive "displacement-measuring device" to interpolate to a geometric constraint with no need for recording joint values. Consequently, it does not require special hardware or software internal to or interfaced with, the robot controller. However, it does require an external measuring device (the displacement-measuring device), such as device 60, but this device is an inexpensive piece of equipment that is used to interpolate to the geometric constraint.

FIG. 18 shows a simple implementation of the displacement-measuring device 60. In this embodiment, a spherical calibration object 62 (the same as 12a and 12b of FIGS. 1 and 20) and a spherical effector object 64 mounted on the end of the linear displacement-measuring device 66 are used. As illustrated, the linear displacement-measuring device 66 is illustrated in two slightly different commanded poses indicated by the symbols A and B, at which the displacement-measuring device will indicate two distinct displacements. FIG. 19 shows a hypothetical plot of the output of the linear displacement-measuring device 66 as a function of displacement. In this example, the outputs are from the two commanded poses A and B in FIG. 18.

In this embodiment, the two commanded poses A and B would be selected to bracket a preset "constraint displacement". An interpolation factor is calculated as the ratio of the displacement from pose A to the constraint displacement, to the displacement from pose A to that of pose B. If the output is linear with displacement, the interpolation factor is equivalent to the ratio of the output difference between pose A and the preset constraint output, to the output difference between pose A and pose B. Other relations can be modeled if the output is not linearly proportional to the displacement. Note that if the output varies linearly with displacement, then the displacement-measuring device may not need to be calibrated.

The interpolation factor will be used to interpolate between the commanded poses A and B in Cartesian coordinates to determine a "constraint pose". Joint values for this constraint pose are determined by inverse kinematics using the nominal, or current, robot model parameters. At this point, parameter identification can continue as stipulated by any appropriate geometric constraint calibration method using the calculated joint configurations of the constraint pose and a modified geometric constraint. Modification of the geometric constraint can be explained as follows.

If the displacement-measuring device is oriented so as to measure displacements perpendicular to the surface of the calibration object, then the constraint pose will represent a preset and constant displacement of the tool tip beyond the initial contact point with the calibration object. This constraint pose will be effectively equivalent to a touch probe encounter (and pose capture) of an tool tip with the surface of a calibration object, but with an effective tool tip length that is smaller than the actual tool tip length, smaller by the preset constraint displacement distance. For instance, if the constraint displacement is set to 0.25 inches, then the constraint poses will correspond to encounters with a touch probe of the shorter tool on a calibration sphere, the tool being 0.25 inches shorter than the actual tool length. Making the appropriate adjustment to the geometric constraint to allow for the constraint displacement, and using the calculated joint configurations determined from the constraint pose, allows geometric constraint routines to be implemented without reading joint configurations and the associated hardware and software modifications and/or interfaces to the controller. Robot calibration based on geometric constraint approaches can be implemented in a stand-alone system brought to the robot to be calibrated.

In order to implement this embodiment, the tool tip needs to swivel about a swivel point so that linear displacements can be measured in different directions. This creates an effective tool tip radius equal to the radius from the swivel point to the tool tip minus the constraint displacement.

It is to be appreciated that using the linear displacement-measuring device with interpolation and inverse kinematics to find joint angles of an encounter between the tool and the reference object is an advantage over the use of trigger probes (including the touch probe of the present invention) in that it does not require the capture of joint angles of the robot by the controller when an encounter occurs. This in turn, allows the processor to be separated from the robot controller (i.e. stand-alone) and the measurement control program to reside in the processor. Further, in such an embodiment, the present invention allows geometric constraint methods for parameter identification to be used (adjusting robot model parameters to force the robot poses of the encounters to be consistent with the requirements of the geometric constraint) rather than a linear measurement device used to measure errors from commanded poses without any real geometric constraints. The robot model parameters are adjusted in parameter identification to change each commanded pose Cartesian coordinates (calculated from the joint values) so that these poses produce the measured linear displacement-measuring device's readings.

FIG. 20 is a schematic diagram showing a six-axis motorized, automated robot having six rotary joints and a reconfigurable displacement measuring tool connected thereto using two reference objects according to the present invention. All numbered items correspond to the same item in FIG. 1, except for the following exceptions. In this embodiment, the controller 20 contains only the robot model 37 and the mechanism control program 26. The mechanism control program 26 is a simple mechanical pattern designed to move the tool tip to a number of commanded poses sets, where each set consists of two poses that bring the tool tip into contact, displacing the tool tip by differing amounts. The processor 21 contains the parameter identification program 24, the robot model 37, and the measurement control program 22. The measurement control program 22 measures displacements from the displacement measurement device, calculates the Cartesian coordinates of the tool at a constraint displacement using interpolation between two commanded positions for which displacement measurements have been made, and then calculates joint angles for these tool coordinates using inverse kinematics. The controller 20 and processor 21 are no longer connected. A cable 39 connects the processor 21 to the tool 14. The tool 14 is shown to swivel and contains the linear displacement-measuring device 66. The tool still is shown to contain an offset 38.

In order to implement the embodiment of FIG. 20, a sequence of pairs of commanded poses are constructed. Each pair of poses is designed to bracket the constraint displacement so that an appropriate interpolation factor is calculated. In one embodiment, the interpolation factor is non-negative and not greater than one, and in other embodiments, it is envisioned that the routine should work fairly well as long as the interpolation factor does not deviate from this allowed range by much. In cases in which the interpolation factor exceeds its allowed range, the routine will be extrapolating instead of interpolating with errors growing the more that the factor exceeds the interpolation range.

It should be appreciated that the distance between commanded poses within each pair should be as small as practical to minimize interpolation errors. There will be errors in each pose in the pair, but for closely spaced poses, these errors should be almost identical. If the errors in the commanded poses are similar, then the errors in the interpolated pose will also be essentially the same. This means that the joint values calculated from the interpolated constraint pose will accurately represent the joint values that would be found if the robot were actually posed in the constraint pose.

The constructed sequence of commanded pose pairs allows the calibration object to be measured from different robot configurations. In one embodiment, these poses are constructed off-line using approximate locations of any calibration objects, possibly entered by hand, and the constructed sequence are then conveniently loaded into the robot controller as a pattern of moves and dwells. It is to be appreciated that dwells allows for robot settle time and subsequent displacement measurements to be made. In one embodiment, displacement measurements are triggered by a settling in the output signal. Files of displacement measurements are then matched with the appropriate commanded pose pairs for further processing. Once data acquisition is complete, another routine calculates the joint values of the constraint poses. The constraint pose joint values are then fed into a parameter identification algorithm that calculates the best set of model parameters to minimize errors according to the geometric constraint method being implemented.

It is to be appreciated that the present invention simplifies computation of pose accuracy by not constructing a characteristic equation. In particular, in the present invention there is no calculation of a moment of inertia, or methods to solve for Eigen values as solutions to a characteristic equation. There is no search through parameter space in the sense of a method of steepest descent. Further, the use of a point as a geometric constraint avoids the use of extended constraint geometries as constraints such as lines and planes that extend throughout the work envelope of robot with associated requirements on the extent of poses throughout the volume of the robot envelope used for joint angle determinations.

Additionally, no ball-in-socket mechanism is used. In one embodiment, the use of a tool to signal an encounter and controller to read joint angles of the encounters between the tool and the reference object is an advantage over the use of a ball-in-socket method since a ball-in-socket mechanism is not practical on motorized robots due to stresses induced by errors in the robot model during movement of the ball-in-socket tool in a plurality of poses. Further, unlike the present invention, a ball-in-socket mechanism does not allow parameters of the end-effector to be removed from the robot model. Moreover, in another embodiment, the use of a linear displacement-measuring device, with interpolation and inverse kinematics to find joint angles of an encounter between the tool and the reference object, does not cause mechanical stresses induced by errors in the robot model during movement of the tool in a plurality of poses, unlike a ball-in-socket method.

It will, however be appreciated that various modifications and changes may be made thereto without departing from the broader spirit and scope of the invention as set forth in the appended claims. The specification and drawings are, accordingly, to be regarded in an illustrative rather than a restrictive sense.

The invention claimed is:

1. A method providing improved pose accuracies in a multi-jointed robot, said method comprising:
providing a pair of reference objects each of a known geometry and each defining a unique constraint point of unknown pose, distance between constraint points from said reference objects forming a known constraint distance;

providing an effector object on the robot, said effector object is movable by the robot in at least two axes and is configured to indicate an encounter with at least one of said reference objects;

providing a plurality of encounters of said effector object with said reference objects;

determining joint values of the robot for each of said encounters;

calculating a first pose of a first reference point from said joint values determined from at least four of said encounters with a first one of said reference objects, said first pose corresponding to a first calculated pose of said constraint point of said first reference object;

calculating a second pose of a second reference point from said joint values determined from at least four of said encounters with a second one of said reference objects, said second pose corresponding to a second calculated pose of said constraint point of said second reference object;

calculating a first difference between said first or second pose and a trial pose of said constraint point for said first or second reference object, respectively;

calculating a second difference between a calculated constraint distance and said known constraint distance, said calculated constraint distance is the distance between said trial poses of said constraint points of said pair of reference objects;

identifying kinematic model parameters of said robot model and trial poses of said constraint points of said pair of reference objects which minimize said first and second differences; and, using said identified kinematic model parameters for improved pose accuracies in the multi-jointed robot.

2. The method of claim 1, wherein identifying kinematic model parameters is accomplished using a chain rule for differentiation in a Jacobian derivation for variations in calculated poses of at least said first reference point as a function of variations in said robot model parameters.

3. The method of claim 1, wherein said effector object is an offset touch probe with a spherical tip.

4. The method of claim 1, wherein said reference points are calculated using intersections of planes that perpendicularly bisect line segments formed between points representing encounters of said effector object with said reference objects.

5. The method of claim 1, wherein the reference objects are spheres.

6. The method of claim 1, wherein said calculated poses and said trial poses are partial poses.

7. The method of claim 1, wherein determining said joint values is accomplished using an external measuring device that measures pose of said effector object relative to at least one of said reference objects.

8. The method of claim 1, wherein determining said joint values is accomplished using an external measuring device that measures pose of said effector object relative to at least one of said reference objects, said external measuring device being a linear displacement-measuring device and interpolation is used between two commanded poses to define an encounter with said at least one of said reference objects and inverse kinematics is used to find said joint values.

9. The method of claim 1, wherein determining said joint values is accomplished using a controller of the robot.

10. The method of claim 1, wherein identifying kinematic model parameters of said robot model which minimize said first and second differences is accomplished using best-fit values for both the model parameters and the trial poses that minimize scatter in clusters of the calculated poses of said first and second reference points about the corresponding trial poses.

11. The method of claim 1, further comprising separating orientations and dimensions of said effector object from the robot model.

12. The method of claim 1, further comprising separating orientations and dimensions of said effector object from the robot model by transforming the orientations and dimensions of the effector object by orientations and dimensions of a tool attachment mechanism of the robot through a matrix product and extraction of net orientations and dimensions.

13. A system providing improved pose accuracies in a robot having a multi-jointed arm, said system comprising:

a controller configured to interpret coordinates within a three dimensional space, move the multi-jointed arm to a location within the three dimensional space that corresponds to the coordinates, and determine joint values of each joint in the multi-jointed arm;

a pair of reference objects each of a known geometry situated within the three dimensional space, each said reference objects defining a unique constraint point of unknown pose and the distance between constraint points from said reference objects forming a known constraint distance therebetween;

an effector object provided on the multi-jointed arm, said effector object is configured to indicate an encounter with at least one of said reference objects; and a processor configured to perform parameter identification, wherein said controller is configured to:

provide a plurality of encounters of said effector object with said reference objects, and, wherein said controller is comprised of said processor, which processor is configured to:

determine joint values of the multi-jointed arm for each of said encounters, calculate a first pose of a first reference point from said joint values determined from at least four of said encounters with a first one of said reference objects, said first pose corresponding to a calculated pose of the constraint point of said first reference object, calculate a second pose of a second reference point from said joint values determined from at least four of said encounters with a second one of said reference objects, said second pose corresponding to a calculated pose of the constraint point of said second reference object, calculate a first difference between said first or second pose and a trial pose of said constraint point for said first or second reference object, respectively, calculate a second difference between a calculated constraint distance and said known constraint distance, said calculated constraint distance is the distance between said trial poses of said constraint points of said pair of reference objects, identify kinematic model parameters of said robot model and said trial poses of the constraint points of said pair of reference objects, which minimize said first and second differences, and wherein said controller is further configured to use said identified kinematic model parameters for improved pose accuracies in the multi-jointed robot.

14. The system of claim 13, wherein said calculated poses and said trial poses are partial poses.

15. The system of claim 13, wherein said effector object is an offset touch probe with a spherical tip.

16. The system of claim 13, wherein said reference points are calculated using intersections of planes that perpendicularly bisect line segments formed between points representing encounters of said effector object with said reference objects.

17. The system of claim 13, wherein said reference objects are spheres.

18. The system of claim 13, wherein said processor is configured to identify said kinematic model parameters of said robot model which minimize said first and second differences by being configured to use best-fit values for the model parameters and the trial poses, that minimize scatter in clusters of calculated poses of said first and second reference points about the corresponding trial poses.

19. The system of claim 13, wherein said processor is further configured to remove orientations and dimensions of said effector object from the robot model by subtracting an effector object frame representing the orientations and dimensions of said effector object from a tool attachment frame representing orientations and dimensions for a tool attachment mechanism of the multi-jointed arm.

20. The system of claim 13, wherein said processor is further configured to separate orientations and dimensions of said effector object from the robot model by transforming the orientations and dimensions of the effector object by orientations and dimensions of a tool attachment mechanism of the robot through a matrix product and extraction of net orientations and dimensions.

21. The system of claim 13, wherein identifying kinematic model parameters is accomplished by using a chain rule for differentiation in a Jacobian derivation for variations in calculated poses of at least said first reference point as a function of variations in said robot model parameters.

22. The system of claim 13, wherein said processor is separate from said controller of the robot.

23. The system of claim 13, further comprises a linear displacement device to which is attached said effector object, wherein the processor is further configured to use input from the linear displacement device to determine pose of said effector object relative to a said reference object via interpolation, said determined pose is used by the processor to determine joint values via inverse kinematic processes, and said joint values are used by the processor to identify the kinematic model parameters.

24. The system of claim 23, wherein said processor is separate from said controller of the robot.

* * * * *